United States Patent
Li et al.

(10) Patent No.: US 11,604,742 B2
(45) Date of Patent: Mar. 14, 2023

(54) INDEPENDENT CENTRAL PROCESSING UNIT (CPU) NETWORKING USING AN INTERMEDIATE DEVICE

(71) Applicant: Huawei Technologies Co., Ltd., Shenzhen (CN)

(72) Inventors: Tao Li, Hangzhou (CN); Lei Huang, Hangzhou (CN); Beilei Sun, Hangzhou (CN); Yunzhi Geng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/171,344

(22) Filed: Feb. 9, 2021

(65) Prior Publication Data

US 2021/0165750 A1    Jun. 3, 2021

Related U.S. Application Data

(63) Continuation of application No. PCT/CN2020/094995, filed on Jun. 8, 2020.

(30) Foreign Application Priority Data

Jun. 25, 2019 (CN) .......................... 201910556090.5
Aug. 23, 2019 (CN) .......................... 201910786539.7

(51) Int. Cl.
*G06F 13/12* (2006.01)
*G06F 9/455* (2018.01)
(Continued)

(52) U.S. Cl.
CPC ........ *G06F 13/128* (2013.01); *G06F 9/45558* (2013.01); *G06F 12/063* (2013.01);
(Continued)

(58) Field of Classification Search
CPC . G06F 2009/45579; G06F 2009/45595; G06F 2213/0058; G06F 2213/3808; G06F 13/161; G06F 13/4221; G06F 9/541
See application file for complete search history.

(56) References Cited

U.S. PATENT DOCUMENTS 10,452,570 B1 * 10/2019 Liguori ............... G06F 9/45558
10,817,456 B2 * 10/2020 Feehrer ............... G06F 9/45545
(Continued)

FOREIGN PATENT DOCUMENTS

CN         1967517 A     5/2007
CN       101013989 A     8/2007
(Continued)

OTHER PUBLICATIONS

Wang Zhan et al., "I/O Resource Pooling for Cloud Datacenter," Journal of Integration Technology, vol. 5, No. 1, Jan. 2016, with an English abstract, 16 pages.

*Primary Examiner* — Alina A Boutah
(74) *Attorney, Agent, or Firm* — Conley Rose, P.C.

(57) ABSTRACT

A computer device includes a central processing unit (CPU), a network adapter, a bus, and an intermediate device, where the intermediate device is coupled to both the CPU and the network adapter through the bus, and is configured to establish a correspondence between address information of an agent unit and address information of a function unit, and implement forwarding of a packet between the CPU and the network adapter based on the correspondence.

19 Claims, 17 Drawing Sheets

(51) Int. Cl.
   *G06F 12/06*      (2006.01)
   *H04L 45/74*      (2022.01)
(52) U.S. Cl.
   CPC .... *H04L 45/74* (2013.01); *G06F 2009/45579* (2013.01); *G06F 2009/45595* (2013.01); *G06F 2213/0058* (2013.01); *G06F 2213/3808* (2013.01)

(56) References Cited

U.S. PATENT DOCUMENTS

| | | | |
|---|---|---|---|
| 2007/0097949 A1 | 5/2007 | Boyd et al. | |
| 2007/0136554 A1 | 6/2007 | Biran et al. | |
| 2007/0165596 A1 | 7/2007 | Boyd et al. | |
| 2009/0070775 A1 | 3/2009 | Riley | |
| 2009/0133028 A1 | 5/2009 | Brown et al. | |
| 2012/0166690 A1 | 6/2012 | Regula | |
| 2014/0366018 A1 | 12/2014 | Spradlin et al. | |
| 2016/0117279 A1* | 4/2016 | Borikar ............... | G06F 13/4022 710/316 |
| 2017/0286354 A1* | 10/2017 | Feehrer ............... | G06F 9/45545 |
| 2018/0059939 A1 | 3/2018 | He et al. | |
| 2018/0309595 A1 | 10/2018 | Ma | |
| 2019/0158396 A1 | 5/2019 | Yu et al. | |
| 2019/0377646 A1* | 12/2019 | Schimke ............... | G06F 9/5077 |
| 2021/0004334 A1* | 1/2021 | Tian ................... | G06F 9/45558 |

FOREIGN PATENT DOCUMENTS

| | | | | |
|---|---|---|---|---|
| CN | 101436165 A | | 5/2009 | |
| CN | 101849230 A | | 9/2010 | |
| CN | 102576349 A | * | 7/2012 | ......... G06F 13/4022 |
| CN | 107113240 A | | 8/2017 | |
| CN | 107278359 A | | 10/2017 | |
| CN | 104239161 B | * | 2/2018 | ......... G06F 11/0712 |
| CN | 109302466 A | | 2/2019 | |
| CN | 110389711 A | * | 10/2019 | ......... G06F 13/161 |
| CN | 110955517 A | * | 4/2020 | ......... G06F 9/5077 |
| JP | 2015039080 A | | 2/2015 | |
| WO | 2016065098 A1 | | 4/2016 | |
| WO | 2016101587 A1 | | 6/2016 | |
| WO | WO-2020000489 A1 | * | 1/2020 | ......... G06F 13/4022 |

* cited by examiner

| No. | Function | BDF |
|---|---|---|
| 0 | PF0 | BDF0 |
| 1 | VF0 | BDF1 |
| 2 | VF1 | BDF2 |
| 3 | VF2 | BDF3 |
| 4 | VF3 | BDF4 |
| 5 | VF4 | BDF5 |
| 6 | VF5 | BDF6 |
| 7 | VF6 | BDF7 |
| ... | ... | ... |
| ... | ... | ... |
| 62 | VF61 | BDF61 |
| 63 | VF62 | BDF62 |
| 64 | VF63 | BDF63 |

FIG. 4B

| No. | BarRange | BarBaseAddr | BarAddrMax |
|---|---|---|---|
| 0 | PF0Bar0Range | PF0Bar0Min | PF0Bar0Max |
| 1 | VF0Bar0Range | VF0Bar0Min | VF0Bar0Max |
| 2 | VF1Bar0Range | VF1Bar0Min | VF1Bar0Max |
| 3 | VF2Bar0Range | VF2Bar0Min | VF2Bar0Max |
| 4 | VF3Bar0Range | VF3Bar0Min | VF3Bar0Max |
| 5 | VF4Bar0Range | VF4Bar0Min | VF4Bar0Max |
| 6 | VF5Bar0Range | VF5Bar0Min | VF5Bar0Max |
| 7 | VF6Bar0Range | VF6Bar0Min | VF6Bar0Max |
| ... | ... | ... | ... |
| ... | ... | ... | ... |
| 62 | VF61Bar0Range | VF61Bar0Min | VF61Bar0Max |
| 63 | VF62Bar0Range | VF62Bar0Min | VF62Bar0Max |
| 64 | VF63Bar0Range | VF63Bar0Min | VF63Bar0Max |

FIG. 4C

| No. | Function | BDF | BDF' | Function' |
|---|---|---|---|---|
| 0 | PF0 | BDF0 | BDF'0 | PF'0 |
| 1 | VF0 | BDF1 | BDF'1 | VF'0 |
| 2 | VF1 | BDF2 | BDF'2 | VF'1 |
| 3 | VF2 | BDF3 | BDF'3 | VF'2 |
| 4 | VF3 | BDF4 | BDF'4 | VF'3 |
| 5 | VF4 | BDF5 | BDF'5 | VF'4 |
| 6 | VF5 | BDF6 | BDF'6 | VF'5 |
| 7 | VF6 | BDF7 | BDF'7 | VF'6 |
| … | … | … | … | … |
| … | … | … | … | … |
| 62 | VF61 | BDF61 | BDF'61 | VF'61 |
| 63 | VF62 | BDF62 | BDF'62 | VF'62 |
| 64 | VF63 | BDF63 | BDF'63 | VF'63 |

FIG. 4D

| No. | BarRange | BarBaseAddr | BarAddrMax | BarBaseAddr' | BarAddrMax' |
|---|---|---|---|---|---|
| 0 | PF0Bar0Range | PF0Bar0Min | PF0Bar0Max | PF'0Bar0Min | PF'0Bar0Max |
| 1 | VF0Bar0Range | VF0Bar0Min | VF0Bar0Max | VF'0Bar0Min | VF'0Bar0Max |
| 2 | VF1Bar0Range | VF1Bar0Min | VF1Bar0Max | VF'1Bar0Min | VF'1Bar0Max |
| 3 | VF2Bar0Range | VF2Bar0Min | VF2Bar0Max | VF'2Bar0Min | VF'2Bar0Max |
| 4 | VF3Bar0Range | VF3Bar0Min | VF3Bar0Max | VF'3Bar0Min | VF'3Bar0Max |
| 5 | VF4Bar0Range | VF4Bar0Min | VF4Bar0Max | VF'4Bar0Min | VF'4Bar0Max |
| 6 | VF5Bar0Range | VF5Bar0Min | VF5Bar0Max | VF'5Bar0Min | VF'5Bar0Max |
| 7 | VF6Bar0Range | VF6Bar0Min | VF6Bar0Max | VF'6Bar0Min | VF'6Bar0Max |
| ... | ... | ... | ... | ... | ... |
| ... | ... | ... | ... | ... | ... |
| 62 | VF61Bar0Range | VF61Bar0Min | VF61Bar0Max | VF'61Bar0Min | VF'61Bar0Max |
| 63 | VF62Bar0Range | VF62Bar0Min | VF62Bar0Max | VF'62Bar0Min | VF'62Bar0Max |
| 64 | VF63Bar0Range | VF63Bar0Min | VF63Bar0Max | VF'63Bar0Min | VF'63Bar0Max |

FIG. 4E

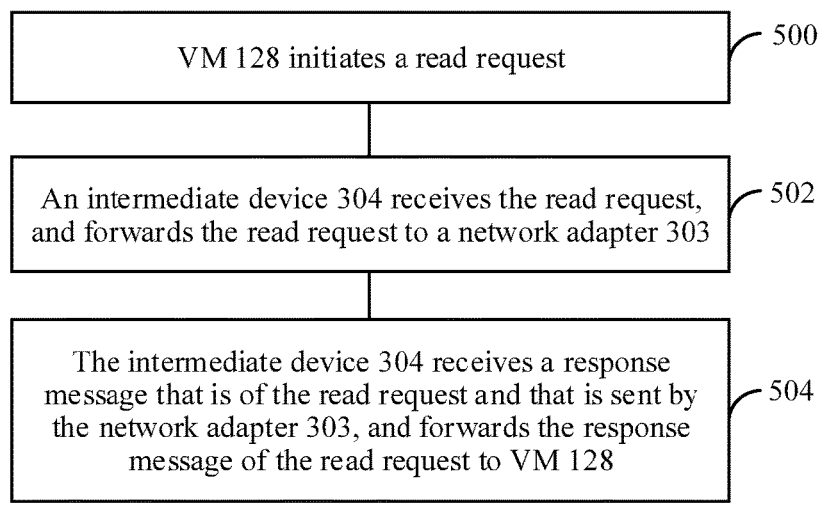

FIG. 5

INDEPENDENT CENTRAL PROCESSING UNIT (CPU) NETWORKING USING AN INTERMEDIATE DEVICE

CROSS-REFERENCE TO RELATED APPLICATIONS

This application is a continuation of International Patent Application No. PCT/CN2020/094995 filed on Jun. 8, 2020, which claims priority to Chinese Patent Application No. 201910786539.7 filed on Aug. 23, 2019, and Chinese Patent Application No. 201910556090.5 filed on Jun. 25, 2019. All of the aforementioned patent applications are hereby incorporated by reference in their entireties.

TECHNICAL FIELD

This application relates to the field of information technologies, and in particular, to a packet forwarding method, an intermediate device, and a computer device.

BACKGROUND

With the advent of technologies such as multi-core processor, virtualization technology, and distributed storage emerge, a new computing mode has emerged as cloud computing. Cloud computing is a network-based configurable computing resource pool capable of providing dynamically scalable resources over a network. Therefore, the virtualization technology becomes an important technical feature of cloud computing, and virtualization generally includes resource virtualization, application virtualization, and the like.

Because of continuous deepening of cloud computing applications and increasing demand for large data processing, 2-way, 4-way, or 8-way servers with powerful performance and high availability are widely used.

For example, a 2-way server is usually configured with two central processing units (CPUs) and a single network adapter. In this configuration, when a CPU needs to be coupled to a network adapter through another CPU, there will be a high delay when a packet from the CPU is forwarded.

SUMMARY

Various embodiments provide a packet forwarding method, an intermediate device, and a computer device, so as to reduce a problem of a high delay caused by packet forwarding, and improve efficiency of packet sending.

According to a first aspect, an embodiment provides a computer device, where the computer device includes a first CPU, a network adapter, and a bus, the computer device further includes an intermediate device, where the intermediate device is coupled to both the first CPU and the network adapter through the bus, and the network adapter includes a plurality of function units generated based on a virtualization technology, the intermediate device is configured to obtain information about a first function unit in the network adapter and allocate an address to the first function unit, the first CPU is configured to obtain information about a first agent unit in the intermediate device, allocate an address to the first agent unit, and send address information of the first agent unit to the intermediate device, where the first agent unit is an agent of the first function unit, and the intermediate device is further configured to establish a correspondence between the address information of the first agent unit and the address information of the first function unit based on the address information of the first agent unit, and implement forwarding of a packet between the first CPU and the network adapter based on the correspondence between the address information of the first agent unit and the address information of the first function unit.

The intermediate device in the computer device can implement forwarding of a packet between the first CPU and the network adapter, and the first CPU can implement forwarding of the packet between the first CPU and the network adapter without using another CPU, such that operations such as a software conversion that are needed when the packet is forwarded to another CPU are omitted, thereby reducing a delay in forwarding the packet. In addition, because the packet is no longer forwarded through the communications bus between the CPUs, there is no problem that a delay caused by insufficient bandwidth of the communications bus between the CPUs is excessively high.

Optionally, the packet includes a data packet or a command packet. The data packet includes but is not limited to data to be read or written, and the command packet includes but is not limited to a control command or a control message to be sent.

Optionally, the bus may be a peripheral component interconnect express (PCIe) bus or an ultra-path interconnect (UPI) bus. When the bus is a PCIe bus, the intermediate device serves as a root node of the PCIe, discovers the network adapter through PCIe enumeration, and obtains information about the function units in the network adapter. The function units are configured to implement functions of the network adapter, and the function units may include a physical function (PF) or a virtual function (VF).

Optionally, the first function unit is one of a plurality of function units that are included in the network adapter and that are generated based on the virtualization technology.

Optionally, the first agent unit is an agent of the first function unit, that is, the first agent unit is a unit that is in the intermediate device and that serves as an agent for a function of the first function unit. For example, when the first function unit is a PF, the first agent unit is an agent unit of the PF, or when the first function unit is a VF, the first agent unit is an agent unit of the VF.

Optionally, the first agent unit is one of the plurality of function units included in the intermediate device, and the first agent unit is configured to implement a function of the network adapter.

Optionally, the information about the first agent unit is information used for identifying the first agent unit. The information used for identifying the first agent unit may be stored in a register of an endpoint port of the intermediate device. When enumerating the intermediate device through the PCIe, the first CPU obtains the information about the first agent unit by obtaining information in the register of the endpoint port. Optionally, information about the PF serving as the agent unit is stored in the register of the endpoint port.

Optionally, the intermediate device is further configured to store the correspondence between the address information of the first agent unit and the address information of the first function unit.

When the bus is a PCIe bus, the first CPU serves as a root node of the PCIe, discovers the intermediate device through PCIe enumeration, and obtains information about the first agent unit in the intermediate device. After discovering the information about the first agent unit in the intermediate device through PCIe enumeration, the first CPU allocates address information to the discovered first agent unit, where the allocated address information includes but is not limited to a bus device function (BDF) and base address register (BAR) space address information.

In an example design, the computer device further includes a second CPU, the second CPU is coupled to both the first CPU and the intermediate device through the bus, the intermediate device is further configured to obtain information about a second function unit in the network adapter and allocate an address to the second function unit, where the second function unit is configured to implement a function of the network adapter, the second CPU is configured to obtain information about a second agent unit in the intermediate device, allocate an address to the second agent unit, and send address information of the second agent unit to the intermediate device, where the second agent unit is an agent of the second function unit, the intermediate device is further configured to establish a correspondence between the address information of the second agent unit and address information of the second function unit based on the address information of the second agent unit, and implement forwarding of a packet between the second CPU and the network adapter based on the correspondence between the address information of the second agent unit and the address information of the second function unit.

When there is no intermediate device in the computer device, a packet to be sent or received by the first CPU needs to be forwarded to the network adapter through a bus between the first CPU and the second CPU. In the computer device provided in this embodiment, the first CPU implements forwarding of a packet by using the intermediate device, such that operations such as a software conversion that are needed when the packet is forwarded to the second CPU are omitted, thereby reducing a delay in forwarding the packet. In addition, because the packet is no longer forwarded through the communications bus between the first CPU and the second CPU, there is no problem that a delay is excessively high because of insufficient bandwidth of the communications bus.

Optionally, the second agent unit is an agent of the second function unit, that is, the second agent unit is a unit that is in the intermediate device and that serves as an agent for a function of the second function unit. For example, when the second function unit is a PF, the second agent unit is an agent unit of the PF, or when the second function unit is a VF, the second agent unit is an agent unit of the VF.

Optionally, the information about the second agent unit is information used for identifying the second agent unit. The information used for identifying the second agent unit may be stored in a register of an endpoint port of the intermediate device. When enumerating the intermediate device through the PCIe, the second CPU obtains the information about the second agent unit by obtaining information in the register of the endpoint port. Optionally, information about the PF serving as the agent unit is stored in the register of the endpoint port.

Optionally, the intermediate device is further configured to store the correspondence between the address information of the second agent unit and the address information of the second function unit.

When the bus is a PCIe bus, the second CPU serves as a root node of the PCIe, discovers the intermediate device through PCIe enumeration, and obtains information about the second agent unit in the intermediate device. After discovering the information about the second agent unit in the intermediate device through PCIe enumeration, the second CPU allocates address information to the discovered second agent unit, and the allocated address information includes but is not limited to the BDF and the BAR space address information.

In an example design, the computer device further includes a second CPU, the second CPU is coupled to both the first CPU and the network adapter through the bus, and the network adapter is further configured to forward a packet between the second CPU and a network.

A packet to be sent or received by the second CPU in the computer device is forwarded through the network adapter, and a packet to be sent or received by the first CPU is forwarded through the intermediate device, such that operations such as a software conversion that are needed when the first CPU forwards the packet to the second CPU are omitted, thereby reducing a delay in forwarding the packet. In addition, because the packet to be sent or received by the first CPU is no longer forwarded by the second CPU, there is no problem that a delay is excessively high because of insufficient bandwidth of the communications bus.

In an example design, the network device further includes a controller and a memory, the controller is configured to obtain information about the first function unit, allocate an address to the first function unit, and establish a correspondence between address information of the first agent unit and address information of the first function unit based on the address information of the first agent unit, the memory is configured to store a correspondence between the address information of the first agent unit and the address information of the first function unit, and the controller is further configured to implement forwarding of a packet between the first CPU and the network adapter based on the correspondence between the address information of the first agent unit and the address information of the first function unit.

In an example design, that the first CPU obtains information about a first agent unit in the intermediate device and allocates an address to the first agent unit includes the first CPU obtains the information about the first agent unit in the intermediate device by enumerating the intermediate device, and allocates the address to the first agent unit.

In an example design, that the second CPU obtains information about a second agent unit in the intermediate device and allocates an address to the second agent unit includes the second CPU obtains the information about the second agent unit in the intermediate device by enumerating the intermediate device, and allocates the address to the second agent unit.

In an example design, that the intermediate device obtains information about a first function unit in the network adapter and allocates an address to the first function unit includes the intermediate device obtains the information about the first function unit from the network adapter by enumerating the network adapter, and allocates the address to the first function unit.

In an example design, that the intermediate device obtains information about a second function unit in the network adapter and allocates an address to the second function unit includes the intermediate device obtains the information about the second function unit from the network adapter by enumerating the network adapter, and allocates the address to the second function unit.

In an example design, the intermediate device, such as a controller in the intermediate device, is further configured to configure, based on the information about the first function unit, information about the first agent unit in a first endpoint port, where the first endpoint port is a port that is in the intermediate device and that is coupled to the first CPU.

Optionally, a register of the first endpoint port includes information used for identifying the PF. The information that is used for identifying the PF and that is included in the register of the first endpoint port may be configured when the intermediate device is manufactured, or may be configured in the first endpoint port after the controller obtains the information about the PF and the VF in the network adapter. When the information that is used for identifying the PF and that is included in the register of the first endpoint port is configured in the first endpoint port after the controller obtains the information about the PF and the VF in the network adapter, the intermediate device can configure the corresponding agent unit based on an example situation of the coupled network adapter, so as to more flexibly implement a function of the intermediate device.

Optionally, after obtaining the information that is used for identifying the PF and that is included in the register of the first endpoint port through PCIe enumeration, the first CPU enables a VF Enable register of a single root input/output (I/O) virtualization (SR-IOV) configuration space of the PF, and configures an attribute of the VF, so as to discover the VF. The configuring the attribute of the VF may be configuring a capability of the SR-IOV of the PF to discover the VF. The PF and the VF discovered by the first CPU each may be an implementation of the first agent unit.

Optionally, during PCIe enumeration, the first CPU allocates a BDF to the corresponding PF/VF based on a location of the obtained PF/VF in the PCIe topology, that is, allocates a corresponding BDF to the discovered agent unit.

Optionally, the first CPU obtains a BAR space size of the agent unit (PF' or VF') through enumeration, and configures a start address and an address length of a BAR space address, so as to configure BAR space address information of the first agent unit.

Optionally, the first CPU may further send the address information of the first agent unit, including but not limited to the BDF and BAR space address information of the first agent unit, to the intermediate device by using a transaction layer packet (TLP) packet.

In an example design, the intermediate device, such as a controller in the intermediate device, is further configured to configure, based on the information about the second function unit, information about the second agent unit in a second endpoint port, where the second endpoint port is a port that is in the intermediate device and that is coupled to the second CPU.

Optionally, a register of the second endpoint port includes information used for identifying the PF. The information that is used for identifying the PF and that is included in the register of the second endpoint port may be configured when the intermediate device is manufactured, or may be configured in the second endpoint port after the controller obtains the information about the PF and the VF in the network adapter. When the information that is used for identifying the PF and that is included in the register of the second endpoint port is configured in the second endpoint port after the controller obtains the information about the PF and the VF in the network adapter, the intermediate device can configure the corresponding agent unit based on an example situation of the coupled network adapter, so as to more flexibly implement a function of the intermediate device.

Optionally, after obtaining the information that is used for identifying the PF and that is included in the register of the second endpoint port through PCIe enumeration, the second CPU enables a VF Enable register of an SR-IOV configuration space of the PF, and configures an attribute of the VF, so as to discover the VF. The configuring the attribute of the VF may be configuring a capability of the SR-IOV of the PF to discover the VF. The PF and the VF discovered by the second CPU each may be one implementation of the second agent unit.

Optionally, during PCIe enumeration, the second CPU allocates a BDF to the corresponding PF/VF based on a location of the obtained PF/VF in the PCIe topology, that is, allocates a corresponding BDF to the discovered agent unit.

Optionally, the second CPU obtains a BAR space size of the agent unit (PF or VF) through enumeration, and configures a start address and an address length of a BAR space address, so as to configure BAR space address information of the second agent unit.

In an example design, the address information of the first function unit includes BDF information and BAR space address information of the first function unit, and the address information of the first agent unit includes BDF information of the first agent unit and BAR space address information of the first agent unit.

Optionally, the second CPU may further send the address information of the second agent unit, including but not limited to the BDF and BAR space address information of the second agent unit, to the intermediate device by using a TLP packet.

In an example design, the network adapter supports an SR-IOV function, and the function unit includes a PF or a VF.

Optionally, the intermediate device may be implemented by a device such as a field programmable gate array (FPGA), an application-specific integrated circuit (ASIC), or an FPGA+ an ASIC.

According to a second aspect, an embodiment provides an intermediate device, where the intermediate device is coupled to a first CPU and a network adapter that are in a computer device through a bus, and the intermediate device includes a controller and a memory, the controller is configured to obtain information about the first function unit, allocate an address to the first function unit, and establish a correspondence between address information of the first agent unit and address information of the first function unit based on the address information of the first agent unit, where the first function unit is a unit generated based on a virtualization technology in the network adapter, and the first agent unit is an agent of the first function unit, the memory is configured to store a correspondence between the address information of the first agent unit and the address information of the first function unit, and the controller is further configured to implement forwarding of a packet between the first CPU and the network adapter based on the correspondence between the address information of the first agent unit and the address information of the first function unit.

Because the intermediate device stores the correspondence between the address information of the first agent unit and the address information of the first function unit, the intermediate device can implement forwarding of a packet between the first CPU and the network adapter in the computer device in which the intermediate device is located based on the correspondence between the address information of the first agent unit and the address information of the first function unit. In this way, the first CPU forwards the packet to the network adapter without using another CPU, such that operations such as a software conversion that are needed when the packet is forwarded to another CPU are omitted, thereby reducing a delay in sending the packet. In addition, because the packet is no longer forwarded through the communications bus between the CPUs, there is no problem that a delay is excessively high because of the insufficient bandwidth of the communications bus between the CPUs.

Optionally, the packet includes a data packet or a command packet. The data packet includes but is not limited to data to be read or written, and the command packet includes but is not limited to a control command or a control message to be sent.

Optionally, the first function unit is one of a plurality of function units that are included in the network adapter and that are generated based on the virtualization technology.

Optionally, the first agent unit is an agent of the first function unit, that is, the first agent unit is a unit that is in the intermediate device and that serves as an agent for a function of the first function unit. For example, when the first function unit is a PF, the first agent unit is an agent unit of the PF, or when the first function unit is a VF, the first agent unit is an agent unit of the VF.

Optionally, the first agent unit is one of the plurality of function units included in the intermediate device, and the first agent unit is configured to implement a function of the network adapter.

In an example design, the intermediate device is further coupled to a second CPU in the computer device, the controller is further configured to obtain information about a second function unit in the network adapter, allocate an address to the second function unit, obtain address information of a second agent unit, and establish a correspondence between address information of the second agent unit and address information of the second function unit, where the second function unit is configured to implement a function of the network adapter, and the second agent unit is an agent of the second function unit, the memory is configured to store the correspondence between the address information of the second agent unit and the address information of the second function unit, and the controller is further configured to implement forwarding of a packet between the second CPU and the network adapter based on the correspondence between the address information of the second agent unit and the address information of the second function unit.

The intermediate device can implement forwarding of a packet between the first CPU and the network adapter and a packet between the second CPU and the network adapter. Compared with a manner in which the first CPU needs to forward a packet to the network adapter through the second CPU, in this manner, operations such as a software conversion that are needed when the packet is forwarded to the second CPU are omitted, thereby reducing a delay in forwarding the packet. In addition, because the packet is no longer forwarded through the communications bus between the first CPU and the second CPU, there is no problem that a delay is excessively high because of insufficient bandwidth of the communications bus.

Optionally, the second agent unit is an agent of the second function unit, that is, the second agent unit is a unit that is in the intermediate device and that serves as an agent for a function of the second function unit. For example, when the second function unit is a PF, the second agent unit is an agent unit of the PF, or when the second function unit is a VF, the second agent unit is an agent unit of the VF.

Optionally, the information about the second agent unit is information used for identifying the second agent unit. The information used for identifying the second agent unit may be stored in a register of an endpoint port of the intermediate device. When enumerating the intermediate device through the PCIe, the second CPU obtains the information about the second agent unit by obtaining information in a register of the endpoint port. Optionally, information about the PF serving as the agent unit is stored in the register of the endpoint port.

In an example design, the controller is further configured to obtain information about the first function unit in the network adapter by enumerating the network adapter, allocate address information to the first function unit, and store the address information of the first function unit in the memory.

In an example design, the intermediate device further includes a first endpoint port, where the intermediate device is coupled to the first CPU through the first endpoint port, and the controller is further configured to configure information about the first agent unit in the first endpoint port based on the information about the first function unit.

In an example design, the intermediate device further includes a second endpoint port, where the intermediate device is coupled to the second CPU through the second endpoint port, and the controller is further configured to configure information about the second agent unit in the second endpoint port based on the information about the second function unit.

In an example design, that the controller establishes the correspondence between the address information of the first agent unit and the address information of the first function unit includes the controller establishes the correspondence between the address information of the first agent unit and the address information of the first function unit based on the received address information that is of the first agent unit and that is sent by the first CPU.

In an example design, that the controller establishes the correspondence between the address information of the second agent unit and the address information of the second function unit includes the controller establishes the correspondence between the address information of the second agent unit and the address information of the second function unit based on the received address information that is of the second agent unit and that is sent by the second CPU.

In an example design, the intermediate device further includes an endpoint port, where the intermediate device is coupled to the first CPU through the endpoint port, and the endpoint port includes pre-determined information about the first agent unit, and the controller is further configured to establish a correspondence between the address information of the first agent unit and the address information of the first function unit based on the address information of the first agent unit sent by the first CPU.

According to a third aspect, an embodiment provides a packet forwarding method, where the method includes obtaining information about a function unit in a network adapter, allocating an address to the function unit, obtaining address information of an agent unit, and establishing a correspondence between the address information of the agent unit and address information of the function unit, where the function unit is one of a plurality of function units that are included in the network adapter and that are generated based on a virtualization technology, the agent unit is an agent of the function unit, and the network adapter is a device for implementing forwarding of a packet between a computer device and a network, and implementing packet forwarding between a CPU in the computer device and the network adapter based on the correspondence between the address information of the agent unit and the address information of the function unit.

In the foregoing method, forwarding of a packet between the CPU and the network adapter can be implemented based on the correspondence between the address information of the agent unit and the address information of the function unit. In this way, the CPU can forward the packet to the network adapter without using another CPU, such that operations such as a software conversion that are needed when the packet is forwarded to another CPU are omitted, thereby reducing a delay in sending the packet. In addition, because the packet is no longer forwarded through the communications bus between the CPUs, there is no problem that a delay is excessively high because of the insufficient bandwidth of the communications bus between the CPUs.

Optionally, the packet includes a data packet or a command packet. The data packet includes but is not limited to data to be read or written, and the command packet includes but is not limited to a control command or a control message to be sent.

Optionally, the function unit is configured to implement a function of the network adapter. Optionally, the agent unit is an agent of the function unit, that is, the agent unit is a unit that is in the intermediate device and serves as an agent for a function of the function unit. For example, when the function unit is a PF, the agent unit is an agent unit of the PF, or when the function unit is a VF, the agent unit is an agent unit of the VF.

Optionally, the agent unit is one of a plurality of function units included in the intermediate device, and the agent unit is configured to implement a function of the network adapter.

In an example design, the method further includes storing the correspondence between the address information of the agent unit and the address information of the function unit.

In an example design, the method further includes obtaining information about a function unit in the network adapter by enumerating the network adapter.

In an example design, the method further includes configuring information about the agent unit in an endpoint port coupled to the CPU based on the information about the function unit.

Optionally, a register of the endpoint port includes information used for identifying the PF. The information that is used for identifying the PF and that is included in the register of the endpoint port may be configured when the intermediate device is manufactured, or may be configured in the endpoint port after the controller obtains the information about the PF and the VF in the network adapter. When the information that is used for identifying the PF and that is included in the register of the endpoint port is configured in the endpoint port after the controller obtains the information about the PF and the VF in the network adapter, the intermediate device can configure the corresponding agent unit based on an example situation of the coupled network adapter, so as to more flexibly implement a function of the intermediate device.

In an example design, the establishing the correspondence between the address information of the agent unit and the address information of the function unit includes receiving the address information that is of the agent unit and that is sent by the CPU, and establishing the correspondence between the address information of the agent unit and the address information of the function unit based on the address information of the agent unit.

In an example design, the address information includes BDF information and BAR space address information.

According to a fourth aspect, an embodiment provides a computer device, where the computer device includes a first CPU, a network adapter, and a bus, the computer device further includes an intermediate device, where the intermediate device is coupled to both the first CPU and the network adapter through the bus, and the network adapter includes a plurality of function units generated based on a virtualization technology, the intermediate device is configured to enumerate the network adapter and obtain information about a first function unit in the network adapter, the first CPU is configured to discover, through enumeration, the intermediate device coupled to the first CPU, and allocate address information to the first agent unit in the intermediate device, where the first agent unit is an agent of the first function unit, and the intermediate device is further configured to establish a correspondence between the address information of the first agent unit and the address information of the first function unit, and implement packet forwarding between the first CPU and the network adapter based on the correspondence between the address information of the first agent unit and address information of the first function unit.

The intermediate device in the computer device can implement forwarding of a packet between the first CPU and the network adapter, and the first CPU can implement forwarding of the packet between the first CPU and the network adapter without using another CPU, such that operations such as a software conversion that are needed when the packet is forwarded to another CPU are omitted, thereby reducing a delay in forwarding the packet. In addition, because the packet is no longer forwarded through the communications bus between the CPUs, there is no problem that a delay caused by insufficient bandwidth of the communications bus between the CPUs is excessively high.

Optionally, the first CPU is further configured to identify the intermediate device as a network adapter through enumeration.

Optionally, the first function unit is one of a plurality of function units that are included in the network adapter and that are generated based on the virtualization technology.

Optionally, the first agent unit is an agent of the first function unit, that is, the first agent unit is a unit that is in the intermediate device and that serves as an agent for a function of the first function unit. For example, when the first function unit is a PF, the first agent unit is an agent unit of the PF, or when the first function unit is a VF, the first agent unit is an agent unit of the VF.

Optionally, the first agent unit is one of the plurality of function units included in the intermediate device, and the first agent unit is configured to implement a function of the network adapter.

Optionally, the information about the first agent unit is information used for identifying the first agent unit. The information used for identifying the first agent unit may be stored in a register of an endpoint port of the intermediate device. When the first CPU enumerates the intermediate device through PCIe, the first CPU obtains information about the first agent unit by obtaining information in a register of the endpoint port. Optionally, information about the PF serving as the agent unit is stored in the register of the endpoint port.

Optionally, the intermediate device is further configured to store the correspondence between the address information of the first agent unit and the address information of the first function unit.

When the bus is a PCIe bus, the first CPU serves as a root node of the PCIe, discovers the intermediate device through PCIe enumeration, and obtains information about the first agent unit in the intermediate device. After discovering the first agent unit information in the intermediate device through PCIe enumeration, the first CPU allocates address information to the discovered first agent unit, where the allocated address information includes but is not limited to a BDF and BAR space address information.

Optionally, the enumeration in this embodiment is to discover and/or obtain device information, where the device information includes information about a function unit in a device. Illustratively, the intermediate device enumerates the network adapter, that is, the intermediate device discovers and/or obtains information about a function unit in the network adapter, where the information about the function unit includes but is not limited to a BDF number and a BAR space address of the function unit, and the CPU enumerates the intermediate device, that is, the CPU discovers and obtains information about the agent unit in the intermediate device, where the information about the agent unit includes but is not limited to a BDF number and a BAR space address of the agent unit.

In an example design, the first CPU is further configured to allocate a corresponding BDF to the first agent unit based on a location that is of the first agent unit in a topology and that is obtained during an enumeration process.

In an example design, the first CPU is further configured to obtain a BAR space size of the first agent unit through enumeration, and configure a start address and an address length of a BAR space address, so as to configure the BAR space address information of the first agent unit.

In an example design, the intermediate device is a root node of the network adapter, and the network adapter is an endpoint device of the intermediate device, and the intermediate device is an endpoint device of the first CPU, and the first CPU is a root node of the intermediate device.

In an example design, the computer device further includes a second CPU, the second CPU is coupled to both the first CPU and the intermediate device through the bus, the intermediate device is further configured to allocate address information to a second function unit in the network adapter, the second CPU is configured to discover, through enumeration, the intermediate device coupled to the second CPU, and allocate address information to the second agent unit, where the second agent unit is an agent of the second function unit, and the intermediate device is further configured to establish a correspondence between the address information of the second agent unit and the address information of the second function unit, and implement packet forwarding between the second CPU and the network adapter based on the correspondence between the address information of the second agent unit and the address information of the second function unit.

When there is no intermediate device in the computer device, a packet to be sent or received by the first CPU needs to be forwarded to the network adapter through a bus between the first CPU and the second CPU and the second CPU. In the computer device provided in this embodiment, the first CPU implements forwarding of a packet by using the intermediate device, such that operations such as a software conversion that are needed when the packet is forwarded to the second CPU are omitted, thereby reducing a delay in forwarding the packet. In addition, because the packet is no longer forwarded through the communications bus between the first CPU and the second CPU, there is no problem that a delay is excessively high because of insufficient bandwidth of the communications bus.

Optionally, the second CPU is further configured to identify the intermediate device as a network adapter through enumeration.

Optionally, the second agent unit is an agent of the second function unit, that is, the second agent unit is a unit that is in the intermediate device and that serves as an agent for a function of the second function unit. For example, when the second function unit is a PF, the second agent unit is an agent unit of the PF, or when the second function unit is a VF, the second agent unit is an agent unit of the VF.

Optionally, the information about the second agent unit is information used for identifying the second agent unit. The information used for identifying the second agent unit may be stored in a register of an endpoint port of the intermediate device. When enumerating the intermediate device through the PCIe, the second CPU obtains the information about the second agent unit by obtaining information in a register of the endpoint port. Optionally, information about the PF serving as the agent unit is stored in the register of the endpoint port.

Optionally, the intermediate device is further configured to store the correspondence between the address information of the second agent unit and the address information of the second function unit.

When the bus is a PCIe bus, the second CPU serves as a root node of the PCIe, discovers the intermediate device through PCIe enumeration, and obtains information about the second agent unit in the intermediate device. After discovering the information about the second agent unit in the intermediate device through PCIe enumeration, the second CPU allocates address information to the discovered second agent unit, and the allocated address information includes but is not limited to the BDF and the BAR space address information.

In an example design, the computer device further includes a second CPU, the second CPU is coupled to both the first CPU and the network adapter through the bus, and the network adapter is further configured to forward a packet between the second CPU and a network.

In an example design, the intermediate device is further configured to configure, based on the information about the first function unit, information about the agent unit in a first endpoint port, where the first endpoint port is a port that is in the intermediate device and that is coupled to the first CPU.

A packet to be sent or received by the second CPU in the computer device is forwarded through the network adapter, and a packet to be sent or received by the first CPU is forwarded through the intermediate device, such that operations such as a software conversion that are needed when the first CPU forwards the packet to the second CPU are omitted, thereby reducing a delay in forwarding the packet. In addition, because the packet to be sent or received by the first CPU is no longer forwarded by the second CPU, there is no problem that a delay is excessively high because of insufficient bandwidth of the communications bus.

In an example design, the network device further includes a controller and a memory, the controller is configured to establish a correspondence between the address information of the first agent unit and the address information of the first function unit, the memory is configured to store a correspondence between the address information of the first agent unit and the address information of the first function unit, and the controller is further configured to implement forwarding of a packet between the first CPU and the network adapter based on the correspondence between the address information of the first agent unit and the address information of the first function unit.

In an example design, the address information of the first function unit includes BDF information of the first function unit and BAR space address information of the first function unit, and the address information of the first agent unit includes BDF information of the first agent unit and BAR space address information of the first agent unit.

Optionally, a register of the first endpoint port includes information used for identifying the PF. The information that is used for identifying the PF and that is included in the register of the first endpoint port may be configured when the intermediate device is manufactured, or may be configured in the first endpoint port after the controller obtains the information about the PF and information about the VF in the network adapter. When the information that is used for identifying the PF and that is included in the register of the first endpoint port is configured in the first endpoint port after the controller obtains the information about the PF and the VF in the network adapter, the intermediate device can configure the corresponding agent unit based on an example situation of the coupled network adapter, so as to more flexibly implement a function of the intermediate device.

Optionally, after obtaining the information that is used for identifying the PF and that is included in the register of the first endpoint port through PCIe enumeration, the first CPU enables a VF Enable register of an SR-IOV configuration space of the PF, and configures an attribute of the VF, so as to discover the VF. The configuring the attribute of the VF may be configuring a capability of the SR-IOV of the PF to discover the VF. Both the PF and the VF discovered by the first CPU may be one implementation of the first agent unit.

Optionally, during PCIe enumeration, the first CPU allocates a BDF to the corresponding PF/VF based on a location of the obtained PF/VF in the PCIe topology, that is, allocates a corresponding BDF to the discovered agent unit.

Optionally, the first CPU obtains a BAR space size of the agent unit (PF' or VF') through enumeration, and configures a start address and an address length of a BAR space address, so as to configure BAR space address information of the first agent unit.

Optionally, the first CPU may further send the address information of the first agent unit, including but not limited to the BDF and BAR space address information of the first agent unit, to the intermediate device by using a TLP packet.

In an example design, the network adapter supports a SR-IOV function, and the first function unit includes a first PF or a first VF.

Various embodiments further provide a computer readable storage medium including program code, where the program code includes an instruction for performing some or all of the steps of any one of the methods according to the third aspect.

An embodiment further provides a computer readable storage medium, where the computer readable storage medium stores a computer program, and when the computer program runs on a computer, the computer is enabled to perform any one of the example methods according to the third aspect.

An embodiment further provides a computer program product, where when the computer program product runs on a computer, the computer is enabled to perform any one of the methods according to the third aspect.

It can be understood that any one of the foregoing storage device, computer readable storage medium, computer program product, or the like, is configured to perform the corresponding method provided above. Therefore, for beneficial effects that can be achieved, reference may be made to the beneficial effects in the corresponding method, and details are not described herein again.

BRIEF DESCRIPTION OF DRAWINGS

The following briefly describes the accompanying drawings for describing the embodiments. Apparently, the accompanying drawings in the following description show merely some embodiments of the present disclosure, and a person of ordinary skill in the art may derive other drawings from these accompanying drawings without creative efforts.

FIG. 4B is a schematic diagram of a BDF information recording manner according to an embodiment.

FIG. 4C is a schematic diagram of a BAR information recording manner according to an embodiment.

FIG. 4D is a schematic diagram of a BDF correspondence between PFs and PF's and a BDF correspondence between VFs and VF's according to an embodiment.

FIG. 4E is a schematic diagram of a BAR space address correspondence between PF's and PFs and a BAR space address correspondence between VF's and VFs that are established by a controller 3041.

FIG. 5 is a schematic flowchart of a method for implementing forwarding of a packet between the intermediate device 304 and a network adapter according to an embodiment.

DESCRIPTION OF EMBODIMENTS

Figure 1:
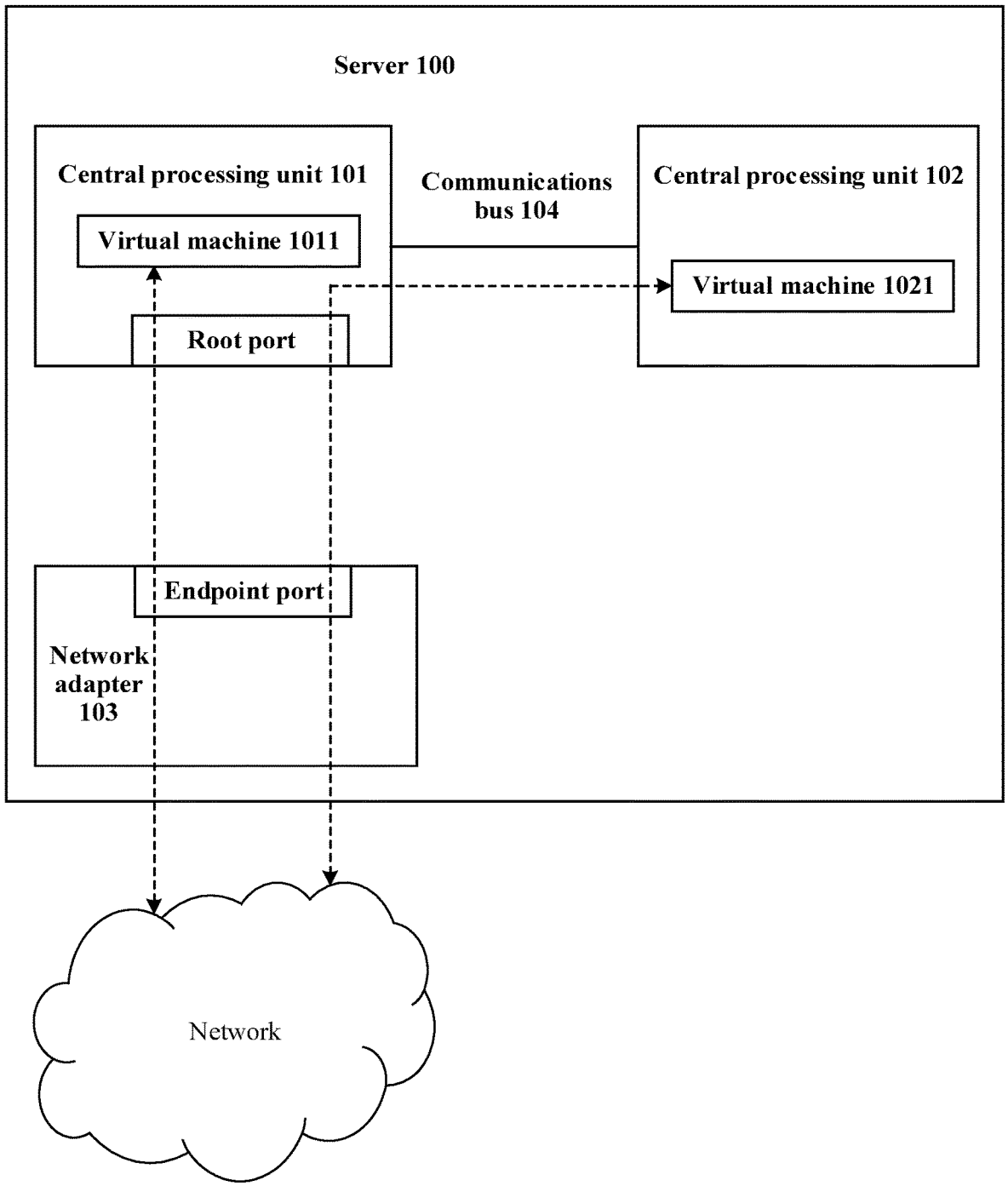
FIG. 1 is a schematic structural diagram of an implementation of a server according to an embodiment.

The following describes technical solutions with reference to accompanying drawings.

The terms "first" and "second" in the embodiments are merely intended for a purpose of description, and shall not be understood as an indication or implication of relative importance or implicit indication of the number of indicated technical features. Therefore, a feature limited by "first" or "second" may explicitly or implicitly include one or more features.

In the embodiments, "at least one" means one or more, and "a plurality of" means two or more. The term "and/or" describes an association relationship between associated objects, and indicates that three relationships may exist. For example, A and/or B may indicate the following only A exists, both A and B exist, and only B exists, where A and/or B may indicate a singular or plural form. The character "/" generally indicates an "or" relationship between the associated objects. "At least one of the following" or a similar expression thereof indicates any combination of the following, and includes any combination of one or more of the following. For example, at least one of a, b, or c may indicate a, b, c, a-b, a-c, b-c, or a-b-c, where a, b, and c may indicate a singular or plural form.

Any embodiment or design scheme described as an "exemplary" or "for example" in this application should not be explained as being more preferred or having more advantages than another embodiment or design scheme. Exactly, use of the word "exemplary" or "example" or the like is intended to present a relative concept in a specific manner.

To help a person skilled in the art better understand the technical solutions in this application, some concepts used in the embodiments are first described.

BDF. A unique identifier of each function in a PCIe device. Each PCIe device may have only one function, or may have a maximum of eight functions. Regardless of how many functions a PCIe device has, each function has a unique independent configuration space. PCIe configuration software (for example, PCIe Rootcomplex) can identify topological logic of a PCIe bus system, and each bus therein, each PCIe device, and each function of each PCIe device, that is, the PCIe configuration software can identify a BDF. In the BDF, Bus Number occupies 8 bits, Device Number occupies 5 bits, and Function Number occupies 3 bits.

PCIe device enumeration. A PCIe architecture generally includes PCIe devices of types such as root complex, switch, and endpoint, and there are generally some embedded endpoints (such devices do not have a PCIe interface to the outside) in the root complex and switch. When a computer system in which the PCIe devices are located starts up, the CPU needs to identify these devices. The root complex typically uses an example algorithm, such as a depth-first algorithm, to access each possible branch path until no further in-depth access is possible, and each PCIe device can be accessed only once. This process is called PCIe device enumeration.

SR-IOV technology. A hardware-based virtualization solution that can improve performance and scalability. With the SR-IOV technology, a single I/O resource can be shared by a plurality of virtual machines (VMs), and each VM can access a unique I/O resource. A PCIe device (for example, Ethernet port) that has enabled SR-IOV and that has appropriate hardware and operating system (OS) support may be shown as a plurality of separate physical devices, and each physical device has its own PCIe configuration space. Based on the technology, two functional types are abstracted for use by users PF and VF. The PF is a fully functional PCIe function that can be discovered, managed, and processed like any other PCIe device. The PF has full configuration resources that can be used to configure or control the PCIe device. The VF is a function associated with the PF, is a lightweight PCIe function, and can share hare one or more physical resources with the PF and other VFs associated with the same PF. The VF is allowed to have only configuration resources used for its own behavior. Each device implementing SR-IOV may have one or more PFs, and each PF may have a maximum of 64,000 VFs associated with it. The PF may create VFs through registers, where the registers are designed with attributes specific to this purpose. Each VF has an PCIe internal space for mapping its register set. A VF device driver operates the register set to enable a function of the VF, and is displayed as an actual PCIe device. Each PF or VF has a unique BDF in a PCIe bus system.

Multi-PF scenario. Physical ports of a physical network adapter can be divided into a plurality of PFs, that is, only one port is physically provided, but a plurality of independent PCIe devices, independent network ports, and independent media access control (MAC) addresses, and the like can be seen in basic I/O system (BIOS) scanning and an OS. For example, an INTEL XL710 network adapter supports 40 gigabit Ethernet (GE) and provides one physical network port, and a 40GE network port can be divided into four 10GE network ports. In this case, one physical port is divided into four PFs.

TLP packet. A PCIe bus transmits data by using a transaction, which is also referred to as a TLP packet. A TLP packet generally includes a header, a data segment, check information, and the like. A PCIe packet includes memory access read/write, I/O access read/write, configuration space access read/write, a message transaction, and the like.

BAR space address. Each PCIe device (for example, PF or VF) has its own internal space, which is not directly accessible to the CPU. When a CPU needs to read data from the internal space of the PF or the VF, the root complex first reads, by using TLP packets, the data from the PF or the VF to a memory accessible to the CPU, and then the CPU reads the data from the memory accessible to the CPU. If the CPU needs to write data into the internal space of the PF or the VF, the CPU writes the data into the memory first, and then the root complex writes the data into the internal space of the PF or the VF by using TLP packets.

Virtualization. Abstracting a resource in a form into a resource in another form is virtualization, which is essentially a simulation. System virtualization is to visualize a physical computer system (host) into one or more VMs. Each VM has its own hardware, such as a CPU, a memory, and various peripherals, and each VM can run its own OS and applications. Hardware resources owned by the VM may be resources simulated by software, or may be real physical hardware.

FIG. 1 is a schematic structural diagram of an implementation of a server. As shown in FIG. 1, the server 100 includes a CPU 101, a CPU 102, and a network adapter 103. The CPU 101 and CPU 102 are coupled through a communications bus 104. The communications bus 104 includes but is not limited to a quick path interconnect (QPI) bus, a UPI bus, or an INTEL® Accelerator Link (IAL) bus. The CPU 101 couples to and communicates with the network adapter 103. The CPU 102 couples to and communicates with the network adapter 103 through the CPU 101. The network adapter 103 couples to and communicates with a network. It should be noted that, for convenience of description, FIG. 1 shows only hardware resources such as CPUs and the network adapter. In example implementation, the server 100 shown in FIG. 1 may further include hardware resources such as a memory and a hard disk, and software resources such as an OS and an application program that need to be run. Details are not described.

A certain number of VMs are run in the server 100. FIG. 1 illustrates an example in which a VM 1011 is run through the CPU 101, and a VM 1021 is run through the CPU 102. When the VM 1011 needs to communicate with the network (for example, transmit or receive data over the network), the VM 1011 establishes a communication connection with the network through the network adapter 103. When the VM 1021 needs to communicate with the network, the VM 1021 needs to establish a communication connection with the network through the communications bus 104, through the CPU 101, and through the network adapter 103.

In FIG. 1, the VM 1011 is directly coupled to the network adapter 103, and the VM 1021 needs to be coupled to the network adapter 103 through the communications bus 104 and the CPU 101. When a data packet or a command packet sent by the VM 1021 is forwarded through the network adapter 103, a related software conversion needs to be performed, including but not limited to a conversion between a protocol of the packet to be sent or received by the VM 1021 and a packet protocol of the communications bus 104. This increases a delay in forwarding the packet between the VM 1021 and the network adapter 103. Further, in addition to being used to transmit a packet that is forwarded by the VM 1021 to the network adapter 103, the communications bus 104 is further used to transmit other services that need to be transmitted between the CPU 101 and the CPU 102. When the VM 1021 runs a data-intensive application program, which causes a large amount of data to be accessed, bandwidth of the communications bus 104 may not meet a requirement for bandwidth used by the VM 1021 to transmit the data. As a result, a delay in sending or receiving a data packet or a command packet by the VM 1021 increases because of insufficient bandwidth.

To resolve the problem of a high delay in transmitting a data packet or a command packet between a CPU 102 and a network adapter in the scenario shown in FIG. 1, an embodiment provides a computer device including an intermediate device, where forwarding of the data packet or the command packet between a CPU and the network adapter in the computer device can be implemented through the intermediate device, so as to reduce a delay in forwarding of the data packet or the command packet between the CPU and the network adapter.

A computer device provided in an embodiment is described below by using a server as an example. It can be understood that a computer device in another form, such as a portable computer or a terminal device, may be implemented with reference to the technical solution provided in this embodiment, provided that two or more processors are coupled to and communicated with a network through a network adapter. Details are not described.

Figure 2A:
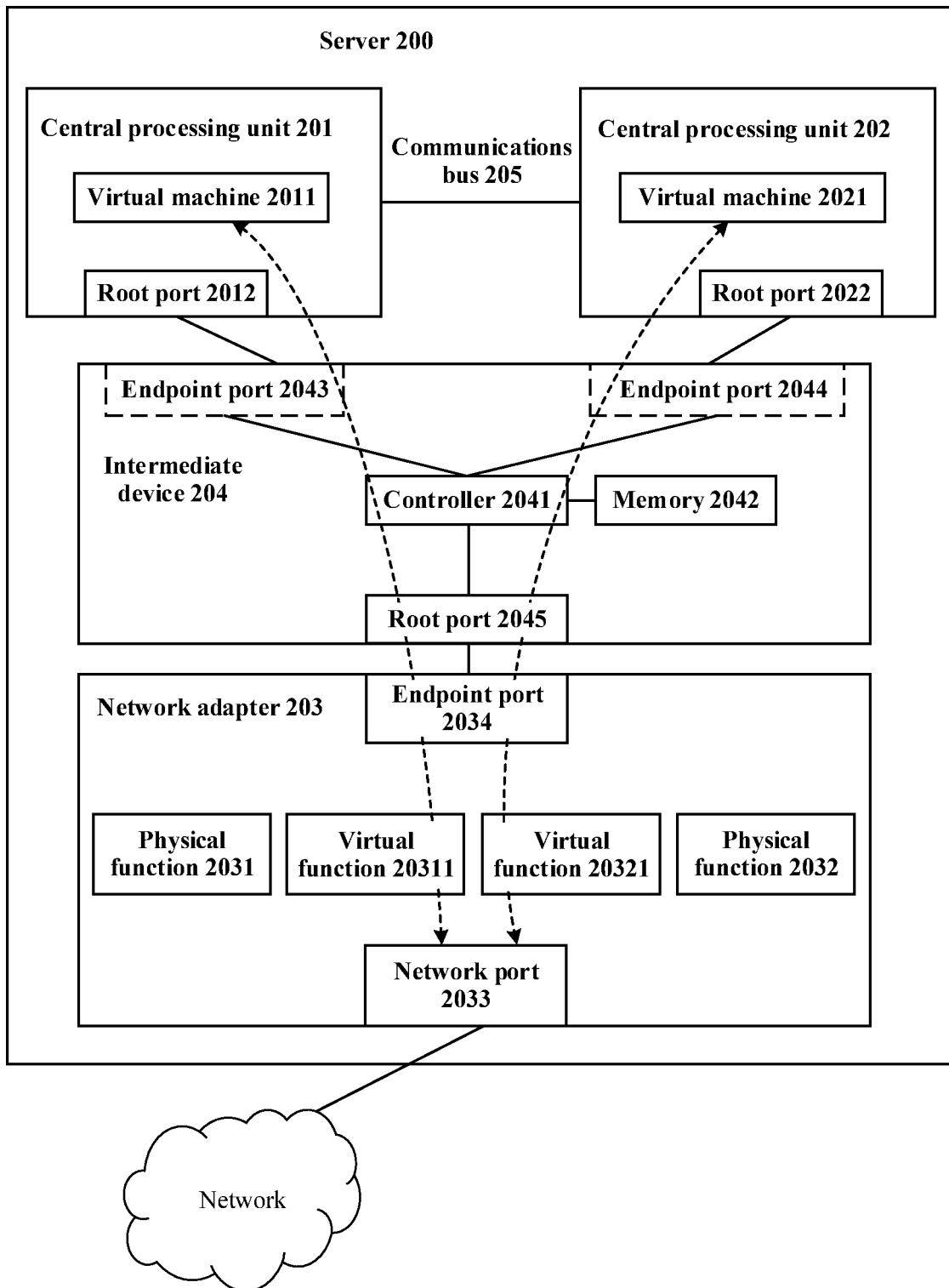
FIG. 2A is a schematic structural diagram of an implementation of a server 200 according to an embodiment.

As shown in FIG. 2A, a server 200 includes a CPU 201, a CPU 202, an intermediate device 204, and a network adapter 203. The intermediate device 204 may be implemented by a device such as an FPGA, an ASIC, or an FPGA+ an ASIC. The network adapter 203 is a physical network adapter, and is configured to connect to a network and forward a data packet or a command packet. The CPU 201 and the CPU 202 are coupled to and communicate with each other through a communications bus 205, where the communications bus 205 includes but is not limited to a QPI bus, a UPI bus, or an IAL bus. The CPU 201 and the CPU 202 are coupled to the intermediate device 204 through a bus (including but not limited to a PCIe bus or a UPI bus). The intermediate device 204 is coupled to the network adapter 203 through a bus (including but not limited to a PCIe bus or a UPI bus).

To clearly describe the technical solution provided in this embodiment, the following further describes an implementation of the server 200 shown in FIG. 2A based on an example in which the CPU 201 and the CPU 202 are coupled to the intermediate device 204 through the PCIe bus, the intermediate device 204 is coupled to the network adapter 203 through the PCIe bus, the VM 2011 runs through the CPU 201, the VM 2021 runs through the CPU 202, the network adapter 203 supports SR-IOV, and the intermediate device 204 is implemented through the FPGA. It can be understood that for another implementation, such as an implementation in which the CPU 201 is coupled to the intermediate device 204 and the intermediate device 204 is coupled to the network adapter through the UPI bus, reference may be made to an implementation similar to that in which the PCIe bus is used. Details are not described again.

In FIG. 2A, the network adapter 203 supporting the SR-IOV includes a PF 2031 and a PF 2032. In addition, in the network adapter 203, a VF 20311 is associated with the PF 2031, and a VF 20321 is associated with the PF 2032. An endpoint port 2034 of the network adapter 203 is coupled to a root port 2045 of the intermediate device 204 through the PCIe bus. A network port 2033 is a port used to connect the network adapter 203 to a network.

The intermediate device 204 includes a controller 2041, a memory 2042, an endpoint port 2043, an endpoint port 2044, and a root port 2045. A controller 2041 is configured to control the intermediate device 204. Optionally, the controller 2041 may be a system-on-a-chip (SoC). As the root port in the root complex, the root port 2045 is coupled to the network adapter 203 through the PCIe bus. The root complex is a root node of a PCIe topology, and generally includes a host bridge, a root port, and an internal bus. In this embodiment, the host bridge may be implemented by the controller 2041. Certainly, the host bridge may alternatively be implemented by another control component in the intermediate device 204 or another control device between the intermediate device and the network adapter 203. This embodiment do not limit an example implementation of the host bridge.

By implementing the root complex using the intermediate device 204, the controller 2041 in the intermediate device 204 can serve as the root node of the PCIe topology, and the PCIe endpoint device coupled to the root port 2045 can be discovered through PCIe enumeration network adapter 203. For example, the controller 2041 discovers the network adapter 203 through PCIe enumeration, and then discovers PFs in the network adapter 203 the PF 2031 and the PF 2032. The controller 2041 enables the VF Enable register of an SR-IOV configuration space of each PF, and configure an attribute of the VF, so as to discover the VF, for example, to discover the VF 20311 and the VF 20321. Illustratively, the intermediate device configures a capability of the SR-IOV of the PF 2031 so as to discover the VF 20311, and configures a capability of the SR-IOV of PF 2032 so as to discover the VF 20321.

The controller 2041 discovers the PF and the VF through PCIe enumeration, allocates corresponding BDFs to the discovered PF and the VF based on the locations of the PF and the VF in the PCIe topology, and stores the allocated BDFs in the memory 2042. For example, the controller 2041 stores a BDF of the PF 2031, a BDF of the VF 20311, a BDF of the PF 2032, and a BDF of the VF 20321 in the memory 2042. In addition, the controller 2041 obtains a BAR space size of each function unit (for example, the PF or the VF) through enumeration, and configures a BAR space address. Using the VF 20311 as an example, the controller 2041 obtains a BAR space size of the VF 20311, and configures a start address and an address length of a BAR space of the VF 20311, where the configured start address and address length of the BAR space of the configured start address and the BAR space address information of the VF 20311 is BAR space address information of the VF 20311. In a similar implementation, the controller 2041 can also obtain a BAR space address of the PF 2031, a BAR space address of the PF 2032, and BAR space address information of the VF 20321. After obtaining a BAR space address of each function unit, the controller 2041 stores it in the memory 2042.

The memory 2042 may be a separate memory in the intermediate device 204, such as a random access memory (RAM), and is configured to store the BDF information and the BAR space address information. Certainly, the controller may alternatively store the BDF information and the BAR space address information in another memory in the intermediate device 204, where another memory may be not a separate memory. This embodiment does not limit an example location for storing the BDF information and the BAR space address information.

In FIG. 2A, both the CPU 201 and the CPU 202 run the root complex, such that both the CPU 201 and the CPU 202 serve as root nodes of the PCIe topology, and can discover the intermediate device 204 as an endpoint device in the PCIe topology through PCIe enumeration. As a root port in the root complex, a root port 2012 is coupled to the endpoint port 2043 of the intermediate device 204 through the PCIe bus, and as a root port in the root complex, a root port 2022 is coupled to the endpoint port 2044 of the intermediate device 204 through the PCIe bus. In this embodiment, an example in which a host bridge of the root complex is implemented by a CPU is used for description. In example implementation, the host bridge may alternatively be implemented by a north bridge chipset, an I/O hub (IOH) chipset, or the like.

The endpoint port 2043 is a port used to couple the intermediate device 204 to the CPU 201, and the endpoint port 2044 is a port used to couple the intermediate device 204 to the CPU 202. When performing PCIe enumeration of the intermediate device 204, the CPU 201 can discover a PF 2031' through the endpoint port 2043, and when performing PCIe enumeration of the intermediate device 204, the CPU 202 can discover a PF 2032' through the endpoint port 2044. Using the CPU 201 as an example, the CPU 201 reads a register of the endpoint port 2043 during PCIe enumeration, and the register stores information used for identifying the PF 2031', where the CPU 201 discovers the PF 2031' based on the information. The information used for identifying PF 2031' may be a code segment, for example, "non-FFFF". The CPU 201 identifies, based on the "non-FFFF", the intermediate device 204 as an endpoint device supporting SR-IOV Optionally, the information used for identifying the PF 2031A' may further include a class code, where the CPU 201 identifies, based on the class code, the intermediate device 204 as a network adapter.

Illustratively, the register of the endpoint port (for example, the endpoint port 2043 or the endpoint port 2044) includes information used for identifying the PF function, and the information may be configured when the intermediate device 204 is manufactured, or may be configured in the endpoint port based on the information about the PF and the VF in the network adapter 203 after the controller 2041 obtains the information about the PF and the VF in the network adapter 203. If the information used for identifying the PF function in the register of the endpoint port is configured when the intermediate device 204 is manufactured, a corresponding PF function needs to be configured based on information about a network adapter that may be coupled when the intermediate device 204 is manufactured. If the information used for identifying the PF function in the register of the endpoint port is configured in the endpoint port after the controller 2041 obtains the information about the PF and the VF in the network adapter 203, the controller 2041 may configure the information used for identifying the PF function in the register of the endpoint port based on the information about the PF in the network adapter 203 coupled to the intermediate device 204.

Using the CPU 201 as an example, the CPU 201 discovers the intermediate device 204 through enumeration, and then discovers the PF 2031' in intermediate device 204, enables a VF Enable register of an SR-IOV configuration space of the PF 2031', and configures an attribute of the VF, so as to discover the VF 20311'. For example, the CPU 201 configures a capability of the SR-IOV of the PF 2031' to discover the VF 20311'. The CPU 201 allocates corresponding BDFs to the PF 2031' and the VF 20311' based on locations of the PF 2031' and the VF 20311' in the PCIe topology. In addition, the CPU 201 obtains BAR space sizes of the PF' and the VF' through enumeration and configures BAR space addresses. Using the VF 20311' as an example, the CPU 201 obtains a BAR space size of the VF 20311', and configures a start address and an address length of a BAR space of the VF 20311', where the configured start address and address length of the BAR space of the configured start address and the BAR space address information of the VF 20311' is BAR space address information of the VF 20311'.

After completing the enumeration, the CPU 201 sends the BDF information and the BAR space address information of the PF 2031' and the BDF information and the BAR space address information of the VF 20311' to the intermediate device 204 by using TLP packets. The controller 2041 establishes, based on the information sent by the CPU 201, a correspondence between the BDF of the PF 2031' and the BDF of the PF 2031 and a correspondence between the BDF of the VF 20311' and the BDF of the VF 20311, and stores the established correspondences in the memory 2042. In addition, the controller 2041 establishes a correspondence between the BAR space address of PF 2031' and the BAR space address of PF 2031 and a correspondence between the BAR space address of VF 20311' and the BAR space address of VF 20311, and stores the established correspondences in the memory 2042.

In this way, the PF 2031' may be considered as an agent of the PF 2031 in the intermediate device 204, or the PF 2031' is a virtual PF that corresponds to the PF 2031 and that is in the intermediate device 204, and the VF 20311' may be considered as an agent of the VF 20311 in the intermediate device 204, or the VF 20311' is a virtual VF that corresponds to the VF 20311 and that is in the intermediate device 204. The CPU 201 discovers, through enumeration, that the intermediate device 204 has a function of the PF (PF 2031') and a function of the VF (VF 20311'), and may use the intermediate device 204 as a network adapter on a PCIe link, and implement forwarding of a data packet or a command packet through the intermediate device 204. The intermediate device 204 then forwards the received data packet or command packet between the intermediate device 204 and the network adapter 203 based on the stored correspondence.

An implementation process of the enumeration of the intermediate device 204 by the CPU 202 is similar to that of the enumeration of the intermediate device 204 by the CPU 201 described above. For example, when the CPU 202 performs PCIe enumeration as the root node of the PCIe topology, the CPU 202 discovers the PF 2032' and configures the VF 20321'. After completing the enumeration, the CPU 202 sends the BDF information and the BAR space address information of the PF 2032' and the BDF information and the BAR space address information of the VF 20321' to the controller 2041 by using TLP packets. The controller 2041 stores a correspondence between the BDF of the PF 2032' and the BDF of PF 2032 and a correspondence between the BDF of the VF 20321' and the BDF of the VF 20321 in the memory 2042. In addition, the controller 2041 stores the correspondence between the BAR space address of the PF 2032' and the BAR space address of the PF 2032 and the correspondence between the BAR space address of the VF 20321' and the BAR space address of the VF 20321 in the memory 2042.

In this way, the PF 2032' may be considered as an agent of the PF 2032 in the intermediate device 204, or the PF 2032' is a virtual PF that corresponds to the PF 2032 and that is in the intermediate device 204, and the VF 20321' may be considered as an agent of the VF 20321 in the intermediate device 204, or the VF 20321' is a virtual VF that corresponds to the VF 20321 and that is in the intermediate device 204. The CPU 202 discovers the PF 2032' and the VF 20321' of the intermediate device 204 through enumeration, and uses the intermediate device 204 as a network adapter on a PCIe link, and can implement forwarding of a data packet or a command packet through the intermediate device 204. The intermediate device 204 then forwards the received data packet or command packet between the intermediate device 204 and the network adapter 203 based on the stored correspondence.

In the foregoing manner, for the intermediate device 204, the network adapter 203 is discovered to be an endpoint device in the PCIe topology through PCIe enumeration, and for the CPU 201 and the CPU 202, the intermediate device 204 is discovered to be an endpoint device in the PCIe topology through PCIe enumeration. The intermediate device 204 stores a correspondence between the PF in the network adapter 203 and the PF' in the intermediate device 204, and stores a correspondence between the VF in the network adapter 203 and the VF' in the intermediate device 204. The intermediate device 204 can implement forwarding of a data packet or a command packet between the VM 2011, the VM 2021, and the network adapter 203 based on the established correspondence between the VF' and the VF. Because the intermediate device 204 can implement forwarding of the data packet or the command packet from the VM 2021 between the VM 2021 and the network adapter 203, and does not need to forward the data packet or the command packet to the network adapter 203 through the CPU 201 and the communications bus 205, thereby avoiding operations such as a software conversion and reducing a delay in sending the data packet or the command packet by the VM 2021. In addition, the data packet or the command packet sent by the VM 2021 is no longer forwarded through the communications bus 205, thereby avoiding a problem that a forwarding delay caused by insufficient bandwidth of the communications bus 205 is excessively high.

It should be noted that, to clearly show a composition of the intermediate device 204 and a relationship between the intermediate device 204 and the CPU, the network adapter, the agent units such as 'the PF2031, the VF20311, the PF2031', and VF20311' in the intermediate device 204 are not shown in the figure. The agent units mentioned in other embodiments are not shown in the corresponding intermediate device, either.

In this embodiment of the present disclosure, the data packet forwarded between the VM and the network adapter, for example, the data packet forwarded between the VM 2011 or the VM 2021 and the network adapter 203, include but are not limited to data to be read or written by the VM, and the command packet forwarded between the VM and the network adapter, for example, the command packet forwarded between the VM 2011 or the VM 2021 and the network adapter 203, includes but is not limited to a control command or a control message to be sent by the VM needs.

Illustratively, in an embodiment, the enumeration process of the intermediate device 204 to the network adapter 203 precedes the enumeration process of the CPU (the CPU 201 or the CPU 202) to the intermediate device 204. For example, the intermediate device 204 and the network adapter 203 are powered on first when the server 200 is started, and the intermediate device 204 performs PCIe enumeration of the network adapter 203, and after PF information and VF information in the network adapter 203 are obtained, the CPU (the CPU 201 or the CPU 202) is powered on, and an enumeration process for the intermediate device 204 is started. In this way, the intermediate device 204 can configure corresponding PF' and VF' resources based on resource conditions of the PF and the VF in the network adapter 203. The PF' resource is an agent of a PF resource in the network adapter 203, and the VF' resource is an agent of a VF resource in the network adapter 203, or the PF' resource is a virtual PF that corresponds to the PF resource in the network adapter 203 and that is in the intermediate device 204, and the VF' resource is a virtual VF that corresponds to the VF resource in the network adapter 203 and that is in the intermediate device 204.

Illustratively, a manner in which the intermediate device 204 and the network adapter 203 are powered on first and the CPU (the CPU 201 or the CPU 202) is powered on later when the server 200 is started includes but is not limited to a manner in which power supplies of the intermediate device 204 and the network adapter 203 are disposed separately from a power supply of the CPU (the CPU 201 or the CPU 202), and then the intermediate device 204 and the network adapter 203 powered on first and the CPU is powered on later, or a circuit control device such as a complex programmable logic device (CPLD) controls the intermediate device 204 and the network adapter 203 to be powered on first and control the CPU (the CPU 201 or CPU 202) to be powered on later. This embodiment do not limit an example implementation.

In FIG. 2A, an example in which the server 200 includes the CPU 201, the CPU 202, and the network adapter 203 is described. In example implementation, the server 200 may further include more than two CPUs. For example, the server 200 may include four CPUs or eight CPUs, and every two CPUs are communicatively coupled to a network through a network adapter. For implementation of every two CPUs, reference may be made to the implementation of the foregoing CPU 201 and CPU 202 through the intermediate device 204, and details are not described again.

Figure 2B:
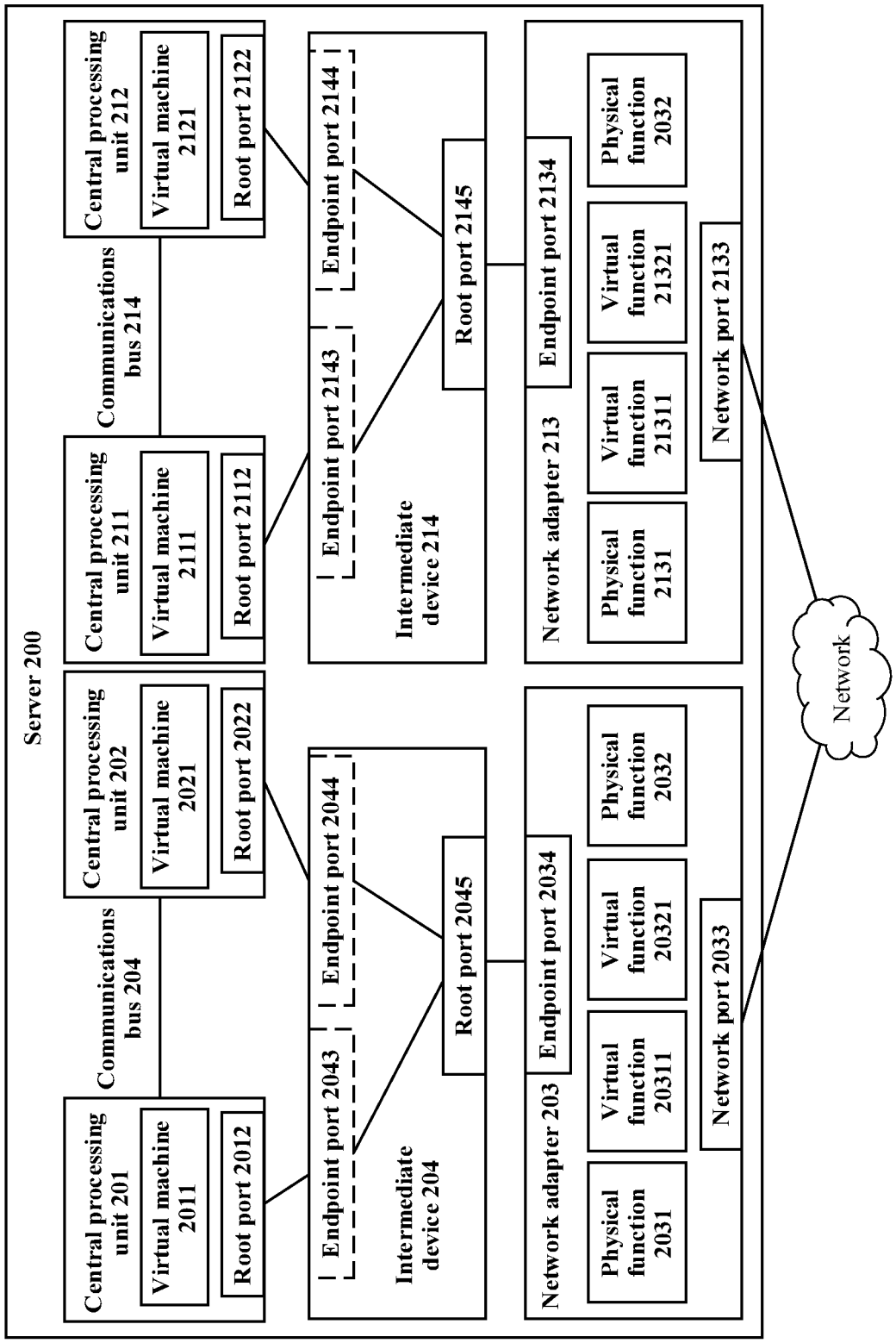
FIG. 2B is a schematic structural diagram of another implementation of the server 200 according to an embodiment.

For example, the server 200 includes four CPUs. As shown in FIG. 2B, the server 200 includes CPU 201, CPU 202, CPU 211, and CPU 212. The CPU 201 and the CPU 202 share the network adapter 203, that is, the CPU 201 and the CPU 202 are coupled to a network through the network adapter 203. The CPU 211 and the CPU 212 share the network adapter 213, that is, the CPU 211 and the CPU 212 are coupled to the network through a network adapter 213. Referring to the foregoing implementation in FIG. 2A, the CPU 201 and the CPU 202 in the server 200 may be coupled to and communicate with the network adapter 203 through an intermediate device 204, and the CPU 211 and the CPU 212 in the server 200 may be coupled to and communicate with the network adapter 213 through an intermediate device 214. Implementation of the intermediate device 214 is similar to that of the intermediate device 204 described above. In this way, not only the delay in sending the data packet or the command packet through the VM 2021 running on the CPU 202 can be reduced, but also the delay in sending the data packet or the command packet through the VM 2121 running on the CPU 212 can be reduced.

Figure 2C:
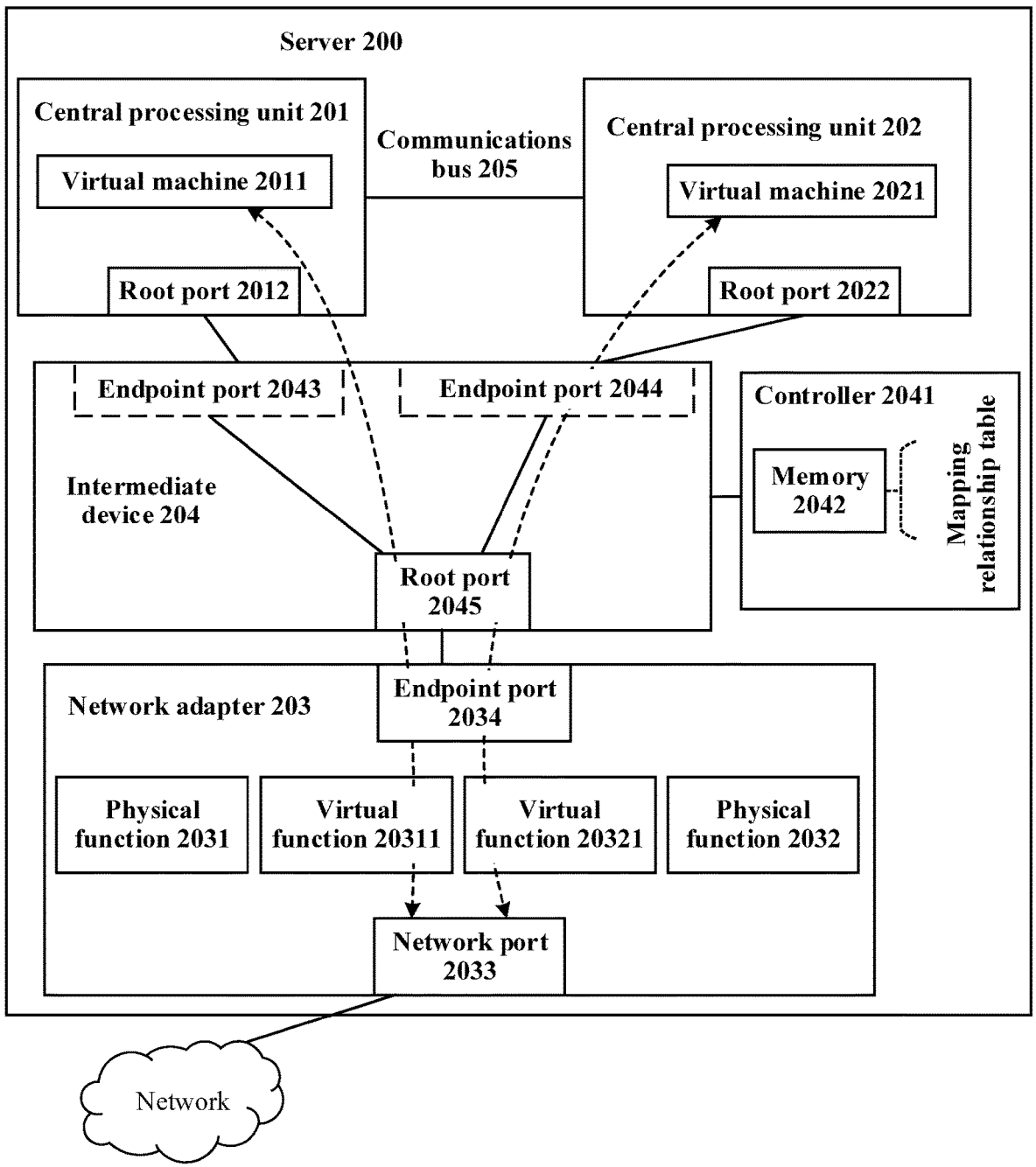
FIG. 2C is a schematic structural diagram of still another implementation of the server 200 according to an embodiment.

In an optional implementation, the controller 2041 of the intermediate device 204 in FIG. 2A may alternatively be deployed outside the intermediate device 204. As shown in FIG. 2C, the controller 2041 is coupled to the intermediate device 204 through a bus (for example, a PCIe bus). Illustratively, the controller 2041 in FIG. 2C may be implemented by an SoC. FIG. 2C illustrates an example in which the controller 2041 includes a memory 2042. In example implementation, the memory 2042 may alternatively be deployed outside the controller 2041. The memory 2042 in FIG. 2C may be implemented by a storage medium such as a RAM, and is configured to store a mapping relationship between a BDF of a PF and a BDF of a PF', a mapping relationship between a BDF of a VF and a BDF of a VF', a mapping relationship between a BAR space address of the PF and a BAR space address of the PF', and a mapping relationship between a BAR space address of the VF and a BAR space address of the VF'.

In this embodiment, the implementation described in FIG. 2A is also applicable to the scenarios shown in FIG. 2B and FIG. 2C. For example, for a manner in which the CPU 211 and the CPU 212 implement forwarding of a data packet or a command packet through the intermediate device 214 and the network adapter 213 in FIG. 2B, reference may be made to the implementation in which the CPU 201 and the CPU 202 implement forwarding of a data packet or a command packet through the intermediate device 204 and the network adapter 203 in FIG. 2A. Alternatively, for implementation of the controller 2041 in FIG. 2C, reference may be made to the implementation of the controller 2041 in FIG. 2A, or the controller in FIG. 2B may be deployed outside the intermediate device 204, or the like. Different combinations of transformations fall within the scope of the embodiments, and details are not described.

Figure 2D:
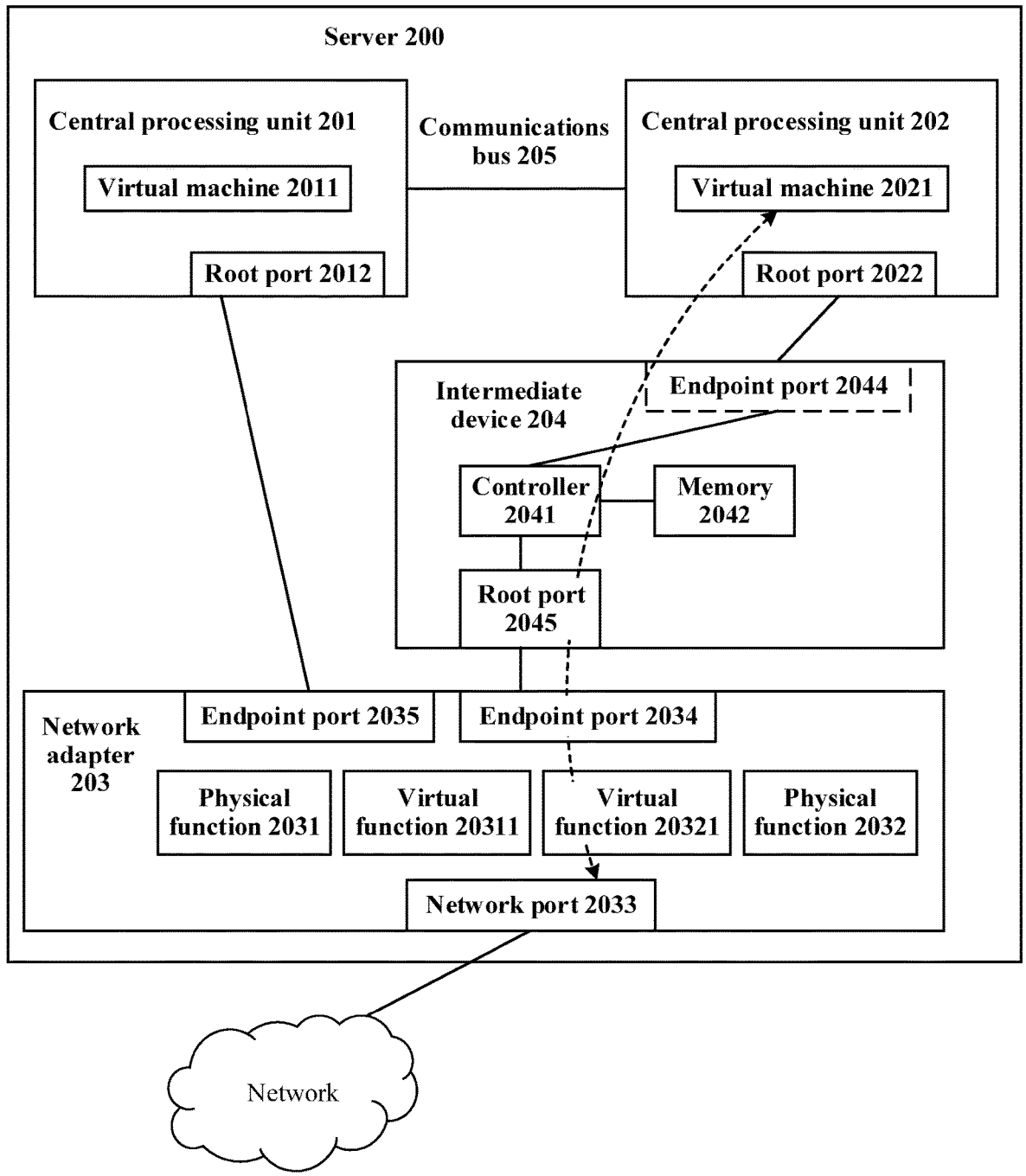
FIG. 2D is a schematic structural diagram of still another implementation of the server 200 according to an embodiment.

In an example implementation, as shown in FIG. 2D, the intermediate device 204 may be used only to forward a data packet or a command packet between the CPU 202 and the network adapter 203, and the CPU 201 may be directly coupled to the network adapter 203 and implement forwarding of a data packet or a command packet. In this scenario, the network adapter 203 includes two endpoint ports (an endpoint port 2034 and an endpoint port 2035), and the CPU 201 and CPU 202 discover the network adapter 203 during PCIe enumeration through the two endpoint ports. In this way, the data packet or command packet sent or received by the VM 2011 is directly forwarded through the network adapter 203. The data packet or command packet sent or received by the VM 2021 is forwarded between the VM 2021 and the network adapter 203 through the intermediate device 204, such that a delay in sending or receiving the data packet or the command packet by the VM 2021 through the communications bus 205 can be reduced.

FIG. 2A to FIG. 2D describe the technical solutions provided in the embodiments based on an example in which one CPU supports running of one VM, a network adapter supports two PFs, and each PF is associated with one VF. In example implementation, one CPU may support running of a plurality of VMs, one network adapter may support a plurality of PFs, and each PF may be associated with a plurality of VFs. To further clearly describe the technical solutions provided in the embodiments, the following describes a manner in which the intermediate device implements forwarding of a data packet or a command packet of a VM based on an example in which the server includes two CPUs and one network adapter, each CPU supports running of 128 VMs, the network adapter supports four PFs, each PF is associated with 64 VFs, and the communications bus is a PCIe bus.

Figure 3:
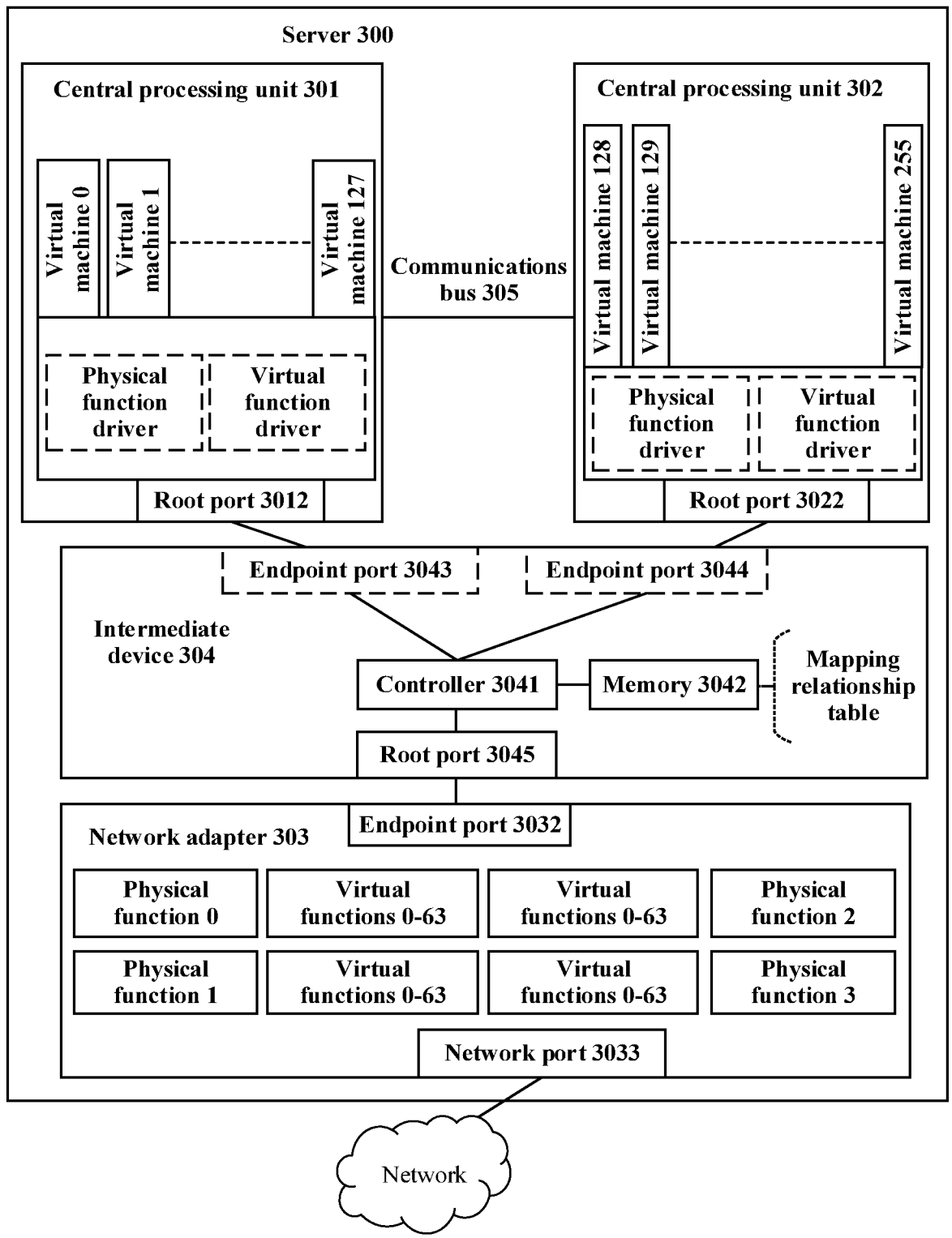
FIG. 3 is a schematic structural diagram of an implementation of a server 300 according to an embodiment.

As shown in FIG. 3, a server 300 includes a CPU 301, a CPU 302, an intermediate device 304, and a network adapter 303. An intermediate device 304 is similar to the intermediate device 204, and may be implemented by an FPGA, an ASIC, or an FPGA+ an ASIC. The network adapter 303 is a physical network adapter, and is coupled to the intermediate device 304 through the PCIe bus. The CPU 301 and the CPU 302 are coupled to and communicate with each other through a communications bus 305, and both the CPU 301 and the CPU 302 are coupled to the intermediate device 304 through the PCIe bus. The communications bus 305 includes but is not limited to a QPI bus, a UPI bus, or a IAL bus. An endpoint port 3043 is a port used to couple the intermediate device 304 to the CPU 301, and an endpoint port 3044 is a port used to couple the intermediate device 304 to the CPU 302. The network adapter 303 supports SR-IOV, and the endpoint port 3032 of the network adapter 303 is coupled to a root port 3045 of the intermediate device 304 through the PCIe bus. A network port 3033 is a port used to connect the network adapter 303 to a network.

It should be understood that FIG. 3 is merely for convenience of description, and only hardware resources such as a CPU and a network adapter are shown. In example implementation, the server 300 shown in FIG. 3 may further include hardware resources such as a memory and a hard disk, and software resources such as an OS and an application program that need to be run. For implementation of a PF and a VF in the network adapter 303 in FIG. 3, reference may be made to the implementation of the network adapter 203 including a PF and a VF in FIG. 2A. For implementation of a PF' and a VF' in the intermediate device 304, reference may be made to the implementation of a PF' and a VF' in the intermediate device 204 in FIG. 2A. In addition, the implementation shown in FIG. 3 may also be applied to the application scenarios shown in FIG. 2B to FIG. 2D, and details are not described.

In FIG. 3, the CPU 301 supports running of VM 0-VM 127, and the CPU 302 supports running of VM 128-VM 255. The network adapter 303 includes PF 0-PF 3, and each PF is associated with 64 VFs VF 0-VF 63. Illustratively, the VF associated with PF 0 and the VF associated with the PF 1 respectively correspond to the VM 0-VM 127, and are used to implement forwarding of data packets or command packets in the VM 0-VM 127, and the VF associated with PF 2 and the VF associated with PF 3 respectively correspond to VM 128-VM 255, and are used to implement forwarding of data packets or command packets in VM 128-VM 255. The corresponding PF driver and VF driver are respectively run in the CPU 301 and the CPU 302 to support corresponding VMs to perform corresponding functions.

It can be understood that, for ease of description only, the CPU 301 in FIG. 3 supports running of VM 0-VM 127, and the CPU 302 supports running of VM 128-VM 255, and a quantity of the VMs in the server 300 is the same as a quantity of the VFs in the network adapter 303, and the VMs and the VFs are in a one-to-one correspondence. In example implementation, the quantity of the VMs running in the CPU 301 and the CPU 302 may alternatively be different from the quantity of the VFs in the network adapter 303. For example, the CPU 301 supports running of 100 VMs, and the 100 VMs respectively correspond to 100 VFs, such that the 100 VMs respectively implement forwarding of data packets or command packets through corresponding VFs. This embodiment does not limit the quantity of the VMs running in the server 300 or the quantity of the PFs or VFs in the network adapter 303, provided that the VMs have corresponding VFs for implementing forwarding of data packets or command packets.

Figure 4A:
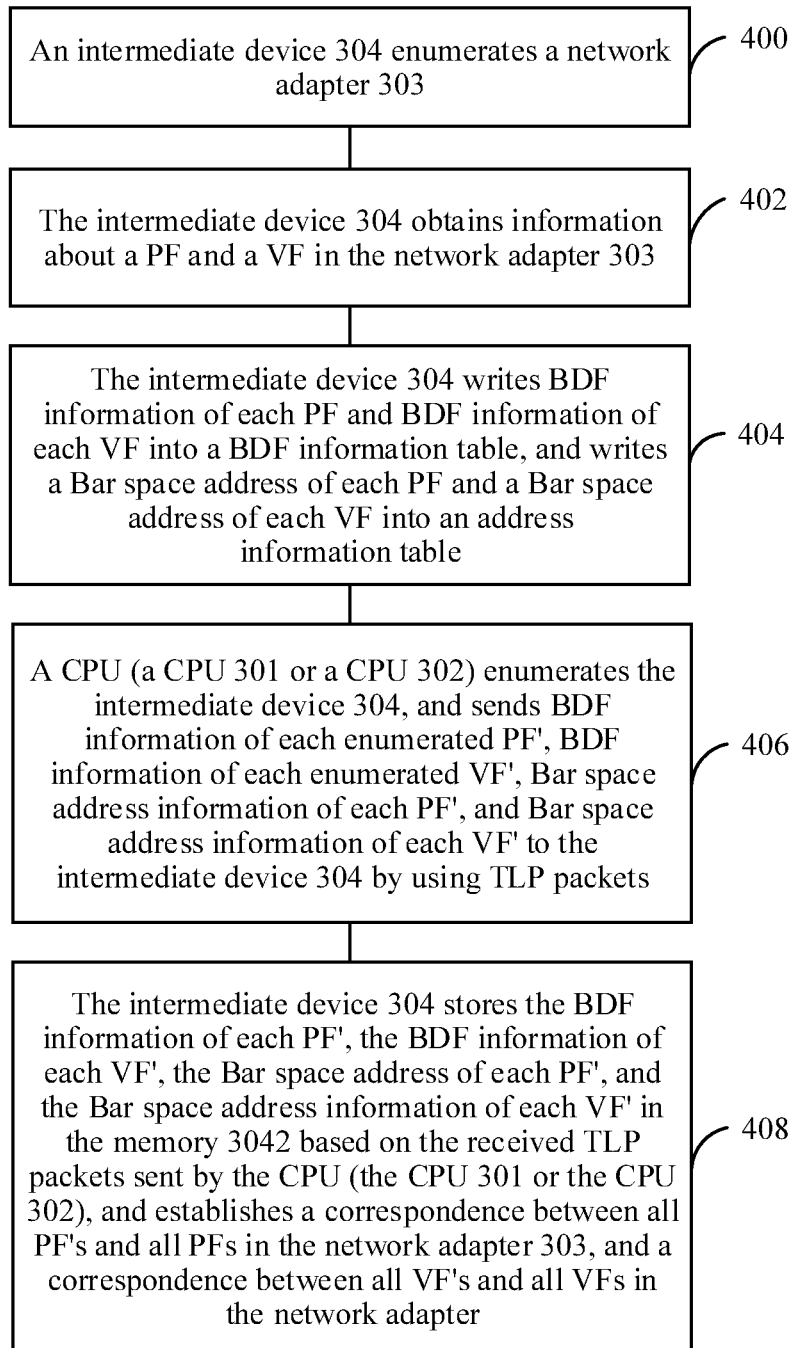
FIG. 4A is a schematic flowchart of a method for establishing a mapping table by the intermediate device 304 in FIG. 3.

A method for establishing a mapping table for the intermediate device 304 in FIG. 3 is used as an example for description. As shown in FIG. 4A, the method includes the following.

Step 400. The intermediate device 304 enumerates the network adapter 303.

When the server 300 is powered on, the intermediate device 304 enumerates the network adapter 303 as root complex through the endpoint port 3032.

Illustratively, the controller 3041 in the intermediate device 304 can implement a function of the Host bridge in the root complex, so as to implement PCIe enumeration of the network adapter 303.

Step 402. The intermediate device 304 obtains information about a PF and a VF in the network adapter 303.

Illustratively, when the controller 3041 in the intermediate device 304 performs PCIe enumeration of the network adapter 303 through the root port 3045, PFs in the network adapter 303, that is, PF 0-PF 3, are enumerated first. The controller 3041 enables the VF Enable register of the SR-IOV configuration space of each PF, configures attributes of the VFs, and then enumerates the 64 VFs associated with each PF. In this way, the controller 3041 discovers, through PCIe enumeration, that the network adapter 303 includes four PFs and 64 VFs associated with each PF.

Step 404. The intermediate device 304 writes BDF information of each PF and BDF information of each VF into a BDF information table, and writes a BAR space address of each PF and a BAR space address of each VF into an address information table.

The controller 3041 in the intermediate device 304 writes the BDF information of each PF and the BDF information of each VF in the network adapter 303 in the memory 3042 in a form of a BDF information table based on the BDF information obtained in the step 402. The BDF information table may be shown in FIG. 4B. It should be noted that FIG. 4B shows only an example implementation of the BDF information table. For example, the BDF information of the PFs is indexed in order of the PFs, and the BDF information of the VFs is indexed in order of the VFs. In addition, FIG. 4B shows only information about PF 0 and information about VF 0-VF 63 associated with PF 0. A form in which the information about PF 1-PF 3 and information about the VFs associated with PF 1-PF 3 are recorded in the BDF information table is similar to the form in which the information about PF 0 and the information about VF 0-VF 63 associated with PF0 are recorded, and details are not described again. The controller 3041 also writes the obtained BAR space address information of each PF and the BAR space address information of each VF into the memory 3042 in a form of a BAR space address information table. The BAR space address information table shown in FIG. 4C records the BAR space address information of the PFs and the BAR space address information of the VFs. Similarly, FIG. 4C shows only the BAR space address information of PF 0 and the BAR space address information of VF 0-VF 63 associated with PF 0. A form in which the BAR space address information of PF 1-PF 3 and the BAR space address information of VFs associated with PF 1-PF 3 are recorded is similar to the form in which the BAR space address information of PF 0 and the BAR space address information of VF 0-VF 63 associated with PF 0 are recorded.

The embodiments do not limit an example form in which the BDF information or the BAR space address information is recorded, and another implementation, for example, an implementation in which BDF labels are indexed to establish a BDF information table also falls within the scope of the embodiments.

Step 406. The CPU (the CPU 301 or the CPU 302) enumerates the intermediate device 304, and sends BDF information of each enumerated PF', BDF information of each enumerated VF', BAR space address information of each PF', and BAR space address information of each VF' to the intermediate device 304 by using TLP packets.

Further, the CPU 301 or the CPU 302 enumerates a plurality of PF's and a plurality of VF's when enumerating the intermediate device 304. For a method for obtaining the information about each PF' or VF' in the enumeration process, reference may be made to the implementation of the method for obtaining the information about the corresponding PF' or VF' when the CPU 201 or the CPU 202 enumerates the intermediate device 204 in FIG. 2A, and details are not described again.

Illustratively, the CPU may alternatively send the BDF information of each enumerated PF', the BDF information of each enumerated VF', the BAR space address information of each PF', and the BAR space address information of each VF' to the intermediate device 304 by using other packets, such as other packets that can be used to transmit address information, or other packets that are used to transmit address information based on the UPI protocol.

Step 408. The intermediate device 304 stores the BDF information of each PF', the BDF information of each VF', the BAR space address of each PF', and the BAR space address information of each VF' in the memory 3042 based on the received TLP packets sent by the CPU (the CPU 301 or the CPU 302), and establishes a correspondence between all PF's and all PFs in the network adapter 303, and a correspondence between all VF's and all VFs in the network adapter.

Illustratively, after the CPU 301 sends the information about the enumerated PF 0' and PF 1', the information about VF 0'-VF 63' associated with PF 0', and the information about VF 64'-VF 127' associated with PF 1' to the intermediate device 304 by using TLP packets, the controller 3041 records the information about PF 0', PF 1', VF 0'-VF 63', and VF 64'-VF 127' in the BDF information table and the BAR space address information table of the memory 3042, so as to establish a correspondence between the PF's and the PFs and a correspondence between the VF's and the VFs. VF 0'-VF 127' correspond to VM 0-VM 127, and are used to implement forwarding of data packets or command packets in VM 0-VM 127.

Similarly, after the CPU 302 sends the information about the enumerated PF 1' and PF 2', the information about VF 128'-VF 191' associated with PF 2', and the information about VF 192'-VF 255' associated with PF 3' to the intermediate device 304 by using TLP packets, the controller 3041 records the information about PF 2', PF3', VF 128'-VF 191', and VF 192'-VF 255' in the BDF information table and the BAR space address information table of the memory 3042, so as to establish a correspondence between the PF's and the PFs and a correspondence between the VF's and the VFs.

FIG. 4D is a schematic diagram of a BDF information table between PF's and PFs and a BDF information table between VF's and VFs that are established by the controller 3041. FIG. 4E is a schematic diagram of a BAR space address correspondence between PF's and PFs and a BAR space address correspondence between VF's and VFs that are established by the controller 3041. It should be noted that FIG. 4D and FIG. 4E only schematically show partial correspondence, and the correspondence between the PF's and the PFs and the correspondence between the VF's and the VFs that are not shown in FIG. 4D and FIG. 4E are shown in a manner similar to that in the figures.

According to the method shown in FIG. 4A, the intermediate device 304 discovers the network adapter 303 through PCIe enumeration, and the CPU discovers the intermediate device 304 during PCIe enumeration. The intermediate device 304 stores the correspondence between the PF's and the PFs in the network adapter 303, and the correspondence between the VF's and the VFs in the network adapter 303, such that the intermediate device 304 can implement forwarding of a data packet or a command packet between a VM running in the CPU and the network adapter based on the stored correspondences, thereby reducing a delay in forwarding the data packets or the command packets through another CPU by the VM running in the CPU.

A method for implementing forwarding of a data packet between the VM and the network adapter by the intermediate device 304 is described below based on an example in which VM 128 initiates a read request. As shown in FIG. 5, the method further includes the following.

Step 500. VM 128 initiates a read request.

Further, the CPU 302 initiates a read request through the root port 3022 by running a driver corresponding to the VM 128. The read request includes address information of requested data, including but not limited to BDF information and BAR space address information of a VF' corresponding to VM 128.

Step 502. The intermediate device 304 receives the read request, and forwards the read request to the network adapter 303.

Further, the intermediate device 304 receives the read request through the endpoint port 3044, and the controller 3041 queries the stored address information table, for example, the stored BDF information table and BAR space address information table, based on the address information in the read request (for example, the address information of the VF' corresponding to VM 128), obtains the address information that is in the network adapter 303 and that corresponds to the address information in the read request (for example, the address information of the VF' corresponding to VM 128), and replaces the address information in the read request with the corresponding address information in the network adapter 303.

Illustratively, the read request sent by VM 128 requests a BDF and a BAR space address by using a destination address of VF 128', and the controller 3041 queries the stored BDF information table and the BAR space address information table, replaces the BDF and the BAR space address of VF 128' in the read request with the BDF and the BAR space address that are in the network adapter 303 and that correspond to the BDF and the BAR space address of VF 128', and sends the replaced read request to the network adapter 303.

Step 504. The intermediate device 304 receives a response message that is of the read request and that is sent by the network adapter 303, and forwards the response message of the read request to VM 128.

After receiving, through the root port 3045, the response message that is of the read request and that is returned by the network adapter 303, the intermediate device 304 queries the stored address information table, obtains the address information that is in the intermediate device 304 and that corresponds to source address information in the response message of the read request, and replaces a source address in the response message of the read request with the corresponding address information in the intermediate device 304.

Illustratively, the source address of the response message that is of the read request and that is sent by the network adapter 303 is a BDF and a BAR space address of VF0 associated with PF 2, and the controller 3041 queries the stored BDF information table and BAR space address information table, replaces the BDF and the BAR space address of VF 0 associated with PF 2 that are in the response message of the read request with the BDF and the BAR space address that are in the corresponding intermediate device 304, and sends the replaced response message of the read request to the VM 128.

For implementation of initiating a write request, sending or receiving a command packet, or the like, by VM 128, the address may be replaced and forwarded based on the BDF information table and the BAR space address information table stored in the intermediate device 304 with reference to the implementation shown in FIG. 5, and details are not described.

Figure 6A:
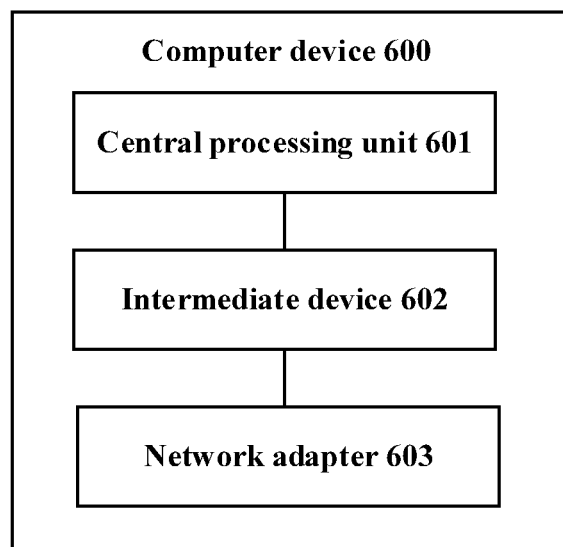
FIG. 6A is a schematic structural diagram of a computer device 600 according to an embodiment.

FIG. 6A is a schematic structural diagram of a computer device 600 according to an embodiment. As shown in FIG. 6A, the computer device 600 includes a CPU 601, a network adapter 603, and an intermediate device 602, where the intermediate device 602 is coupled to both the CPU 601 and the network adapter 603 through a bus, and the network adapter 603 includes a plurality of function units generated based on a virtualization technology. For example, the network adapter 603 includes a plurality of PFs or VFs generated based on an SR-IOV virtualization technology.

The intermediate device 602 is configured to obtain information about a first function unit in the network adapter 603 and allocate an address to the first function unit, and the first function unit is configured to implement a function of the network adapter 603.

The CPU 601 is configured to obtain information about a first agent unit in the intermediate device 602, allocate an address to the first agent unit, and send address information of the first agent unit to the intermediate device 602, where the first agent unit is an agent of the first function unit.

The intermediate device 602 is further configured to establish a correspondence between the address information of the first agent unit and the address information of the first function unit based on the address information of the first agent unit, and implement forwarding of a packet (such as a data packet or a command packet) between the CPU 601 and the network adapter 603 based on the correspondence between the address information of the first agent unit and the address information of the first function unit.

The computer device 600 includes the intermediate device 602, and the intermediate device 602 can implement forwarding of the data packet or the command packet between the CPU 601 and the network adapter 603. The intermediate device 602 establishes and stores the correspondence between the address information of the first agent unit and the address information of the first function unit, and can implement forwarding of the data packet or the command packet between the CPU 601 and the network adapter 603 based on the correspondence between the address information of the first agent unit and the address information of the first function unit. In this way, the CPU 601 can implement forwarding of the data packet or the command packet between the CPU 601 and the network adapter 603 without using another CPU, such that operations such as a software conversion that are needed when the data packet or the command packet is forwarded to another CPU are omitted, thereby reducing a delay in sending the data packet or the command packet. In addition, because the data packet or the command packet is no longer forwarded through the communications bus between the CPUs, there is no problem that a delay is excessively high because of insufficient bandwidth of the communications bus.

Figure 6B:
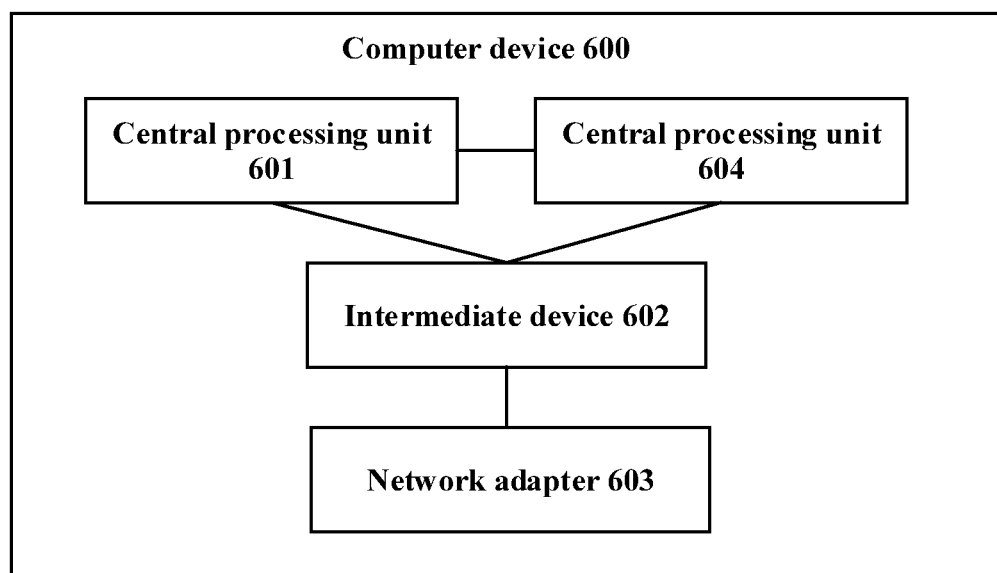
FIG. 6B is another schematic structural diagram of the computer device 600 according to an embodiment.

Optionally, as shown in FIG. 6B, the computer device 600 further includes a CPU 604.

The CPU 604 is coupled to both the CPU 601 and the intermediate device 602 through the bus.

The intermediate device 602 is further configured to obtain information about a second function unit in the network adapter 603, and allocate an address to the second function unit, where the second function unit is configured to implement a function of the network adapter 603.

The CPU 604 is configured to obtain information about a second agent unit in the intermediate device 602, allocate an address to the second agent unit, and send address information of the second agent unit to the intermediate device 602, where the second agent unit is an agent of the second function unit.

The intermediate device 602 is further configured to establish a correspondence between the address information of the second agent unit and the address information of the second function unit based on the address information of the second agent unit, and implement forwarding of a data packet or a command packet between the CPU 604 and the network adapter 603 based on the correspondence between the address information of the second agent unit and the address information of the second function unit.

Figure 6C:
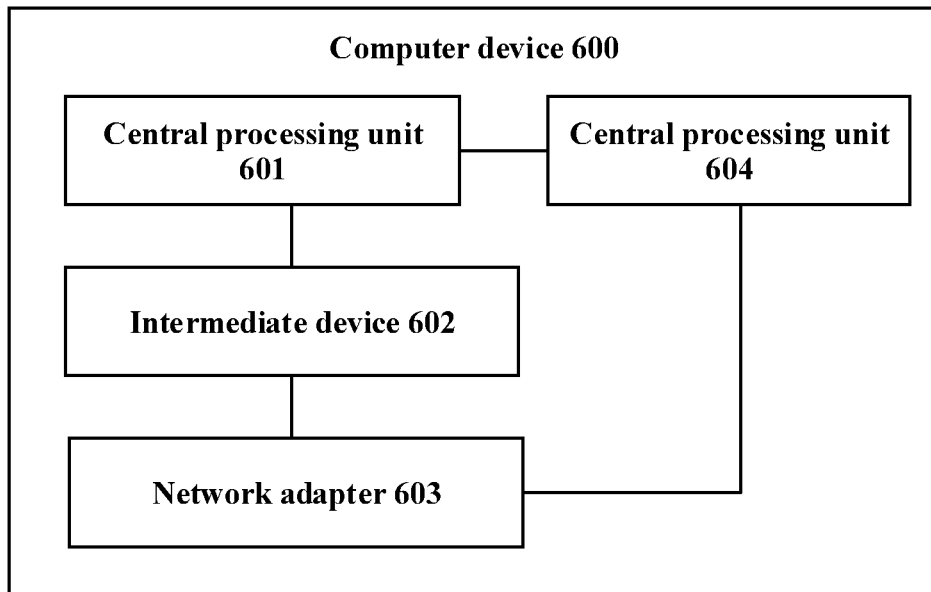
FIG. 6C is still another schematic structural diagram of the computer device 600 according to an embodiment.

Optionally, as shown in FIG. 6C, the computer device 600 further includes a CPU 604.

The CPU 604 is coupled to both the CPU 601 and the network adapter 603 through the bus.

The network adapter 603 is further configured to implement forwarding of a data packet or a command packet between the CPU 604 and the network.

Figure 6D:
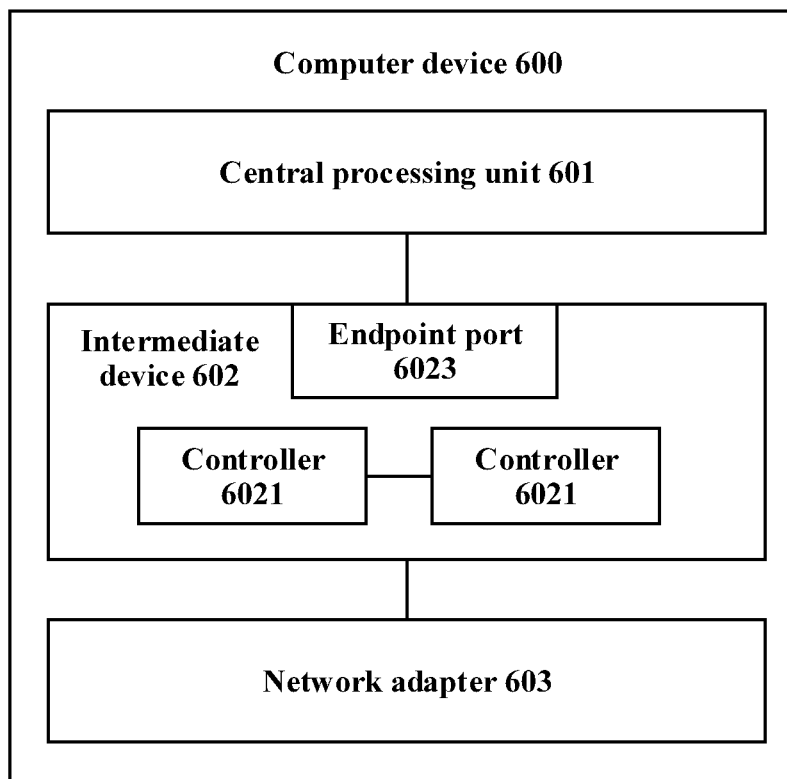
FIG. 6D is still another schematic structural diagram of the computer device 600 according to an embodiment.

In this embodiment, as shown in FIG. 6D, the network device 602 may further include a controller 6021 and a memory 6022. The controller 6021 is configured to obtain information about the first function unit, allocate an address to the first function unit, and establish a correspondence between the address information of the first agent unit and the address information of the first function unit based on the address information of the first agent unit.

The memory 6022 is configured to store the correspondence between the address information of the first agent unit and the address information of the first function unit.

The controller 6021 is further configured to implement forwarding of a data packet or a command packet between the CPU 601 and the network adapter 603 based on the correspondence between the address information of the first agent unit and the address information of the first function unit.

Illustratively, the controller 6021 may configure the first agent unit by configuring information about the first agent unit in the endpoint port 6023. The endpoint port 6023 is a port used to couple the intermediate device 602 to the CPU 601.

In example implementation, for implementation of the computer device 600 shown in FIG. 6A to FIG. 6D, reference may be made to the implementation of the server 200 in FIG. 2A to FIG. 2D and the server 300 in FIG. 3. For example, the intermediate device 602 may be implemented with reference to the implementation of the intermediate device 204 in FIG. 2A to FIG. 2D, or may be implemented with reference to the implementation of the intermediate device 304 in FIG. 3, the controller 6021 may be implemented with reference to the implementation of the controller 2041 in FIG. 2A to FIG. 2D, or may be implemented with reference to the implementation of the controller 3041 in FIG. 3, the CPU 601 may be implemented with reference to the implementation of CPU 202 in FIG. 2A to FIG. 2D, or may be implemented with reference to the implementation of CPU 302 in FIG. 3, the CPU 604 may be implemented with reference to the implementation of CPU 201 in FIG. 2A to FIG. 2D, or may be implemented with reference to the implementation of CPU 301 in FIG. 3, and the network adapter 603 may be implemented with reference to the implementation of the network adapter 203 in FIG. 2A to FIG. 2D, or may be implemented with reference to the implementation of the network adapter 303 in FIG. 3. In addition, the first function unit or the second function unit in the embodiments described in FIG. 6A and FIG. 6B may be implemented with reference to the implementation of the PF and/or the VF mentioned in FIG. 2A to FIG. 2D or FIG. 3, and the first agent unit or the second agent unit may be implemented with reference to the implementation of the PF" and/or the VF mentioned in FIG. 2A to FIG. 2D or FIG. 3. Details are not described again.

It can be understood that when the intermediate device 602 is implemented by an FPGA chip, the FPGA chip may include a controller 6021 and a memory 6022. When the intermediate device 602 is implemented by an ASIC chip, a function of the controller may be implemented by the ASIC chip, and the function of the memory 6022 may be implemented by a memory (such as a RAM) coupled to the ASIC chip. Illustratively, when the intermediate device 602 is implemented by an ASIC, the function of the controller 6021 may be implemented by the ASIC, and the function of the memory 6022 may be implemented by a memory coupled to the ASIC, when the intermediate device 602 is implemented by an FPGA+ an ASIC, the function of the controller 6021 may be implemented by the ASIC, and the function of the memory 6022 may be implemented by the FPGA, or when the intermediate device 602 is implemented by an FPGA+ an ASIC, the function of the controller 6021 may be implemented by both the FPGA and the ASIC, and the function of the memory 6022 may be implemented by the FPGA. Details are not described.

Figure 7:
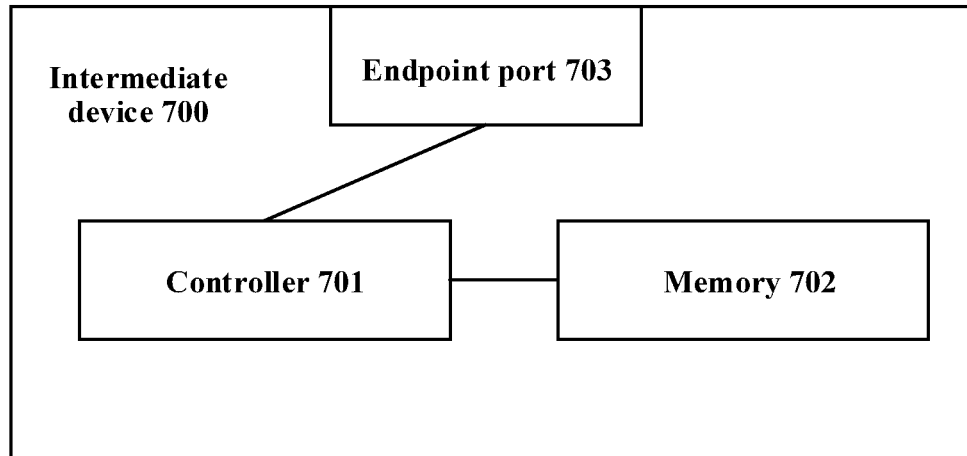
FIG. 7 is a schematic structural diagram of an intermediate device 700 according to an embodiment.

FIG. 7 is a schematic structural diagram of an intermediate device 700 according to an embodiment. The intermediate device 700 is coupled to a first CPU and a network adapter that are in a computer device through a bus. As shown in FIG. 7 the network device 700 may further include a controller 701 and a memory 702.

The controller 701 is configured to obtain information about a first function unit in the network adapter, allocate an address to the first function unit, obtain address information of a first agent unit, and establish a correspondence between the address information of the first agent unit and address information of the first function unit, where the first function unit is a unit generated based on a virtualization technology in the network adapter, and the first agent unit is an agent of the first function unit.

The memory 702 is configured to store the correspondence between the address information of the first agent unit and the address information of the first function unit.

The controller 701 is further configured to implement forwarding of a packet, such as a data packet or a command packet, between the first CPU and the network adapter based on the correspondence between the address information of the first agent unit and the address information of the first function unit.

Because the intermediate device 700 stores the correspondence between the address information of the first agent unit and the address information of the first function unit, the intermediate device 700 can implement forwarding of a data packet or a command packet between the first CPU and the network adapter based on the correspondence between the address information of the first agent unit and the address information of the first function unit. In this way, the first CPU forwards the packet to the network adapter without using another CPU, such that operations such as a software conversion that are needed when the packet is forwarded to another CPU are omitted, thereby reducing a delay in sending the packet. In addition, because the packet is no longer forwarded through the communications bus between the CPUs, there is no problem that a delay is excessively high because of the insufficient bandwidth of the communications bus between the CPUs.

Optionally, the intermediate device is further coupled to a second CPU in the computer device, the controller is further configured to obtain information about a second function unit in the network adapter, allocate an address to the second function unit, obtain address information of a second agent unit, and establish a correspondence between address information of the second agent unit and address information of the second function unit, where the second function unit is configured to implement a function of the network adapter, and the second agent unit is an agent of the second function unit, the memory is configured to store the correspondence between the address information of the second agent unit and the address information of the second function unit, and the controller is further configured to implement forwarding of a data packet or a command packet between the second CPU and the network adapter based on the correspondence between the address information of the second agent unit and the address information of the second function unit.

As shown in FIG. 7, the intermediate device 700 may further include an endpoint port 703, where the intermediate device 700 is coupled to the first CPU through the endpoint port 703. The controller 701 is further configured to configure information about the first agent unit in the endpoint port 703 based on the information about the first function unit.

After the controller 701 configures the information about the first agent unit in the endpoint port 703, the intermediate device 700 can be presented as an endpoint device during an enumeration process of the first CPU, such that the first CPU can obtain the information about the agent unit from the endpoint port 703.

For example implementation of the intermediate device 700, reference may be made to the implementation of the intermediate device 204 in FIG. 2A to FIG. 2D and the intermediate device 304 in FIG. 3. In addition, the first function unit or the second function unit described in the implementation of the intermediate device 700 may be implemented with reference to the implementation of the PF and/or the VF mentioned in FIG. 2A to FIG. 2D or FIG. 3, and the first agent unit or the second agent unit may be implemented with reference to the implementation of the PF' and/or the VF mentioned in FIG. 2A to FIG. 2D or FIG. 3. Details are not described again.

It can be understood that FIG. 7 is a schematic structural diagram of the intermediate device 700 implemented by an FPGA chip. When the intermediate device 700 is implemented by an ASIC chip, a function of the controller 701 may be implemented by the ASIC chip, and a function of the memory 702 may be implemented by a memory (such as a RAM) coupled to the ASIC chip. Illustratively, when the intermediate device 700 is implemented by an ASIC, the function of the controller 701 may be implemented by the ASIC, and the function of the memory 702 may be implemented by a memory coupled to the ASIC, when the intermediate device 700 is implemented by an FPGA+ an ASIC, the function of the controller 701 may be implemented by the ASIC, and the function of the memory 702 may be implemented by the FPGA, or when the intermediate device 700 is implemented by an FPGA+ an ASIC, the function of the controller 701 may be implemented by both the FPGA and the ASIC, and the function of the memory 702 may be implemented by the FPGA. Details are not described.

Figure 8A:
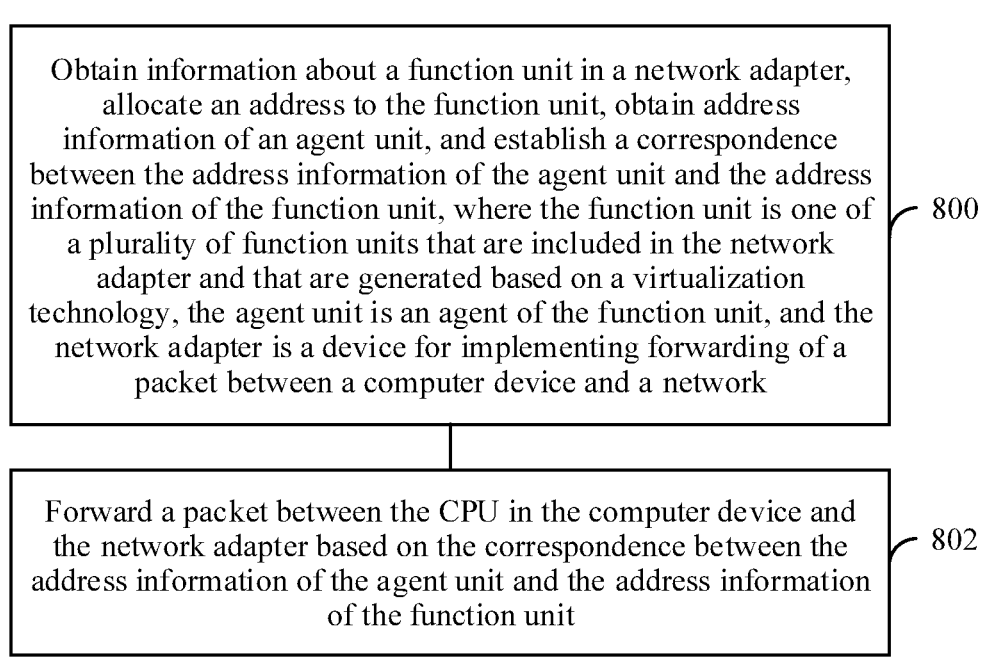
FIG. 8A is a schematic flowchart of a packet forwarding method according to an embodiment.

FIG. 8A is a schematic flowchart of a packet forwarding method according to an embodiment. As shown in FIG. 8A, the method further includes the following.

Step 800. Obtain information about a function unit in a network adapter, allocate an address to the function unit, obtain address information of an agent unit, and establish a correspondence between the address information of the agent unit and the address information of the function unit, where the function unit is one of a plurality of function units that are included in the network adapter and that are generated based on a virtualization technology, the agent unit is an agent of the function unit, and the network adapter is a device for implementing forwarding of a packet (such as a data packet or a command packet) between a computer device and a network.

Step 802. Forward a packet (such as a data packet or a command packet) between the CPU in the computer device and the network adapter based on the correspondence between the address information of the agent unit and the address information of the function unit.

According to the foregoing method, forwarding of a data packet or a command packet between the CPU and the network adapter in the computer device can be implemented based on the correspondence between the address information of the agent unit and the address information of the function unit. In particular, the computer device includes two or more CPUs, and when the two or more CPUs need to be coupled to a network through the network adapter, one of the CPUs forwards the packet to the network adapter without using another CPU, such that operations such as a software conversion that are needed when the packet is forwarded to another CPU are omitted, thereby reducing a delay in sending the data packet or the command packet. In addition, because the packet is no longer forwarded through the communications bus between the CPUs, there is no problem that a delay is excessively high because of the insufficient bandwidth of the communications bus between the CPUs.

Figure 8B:
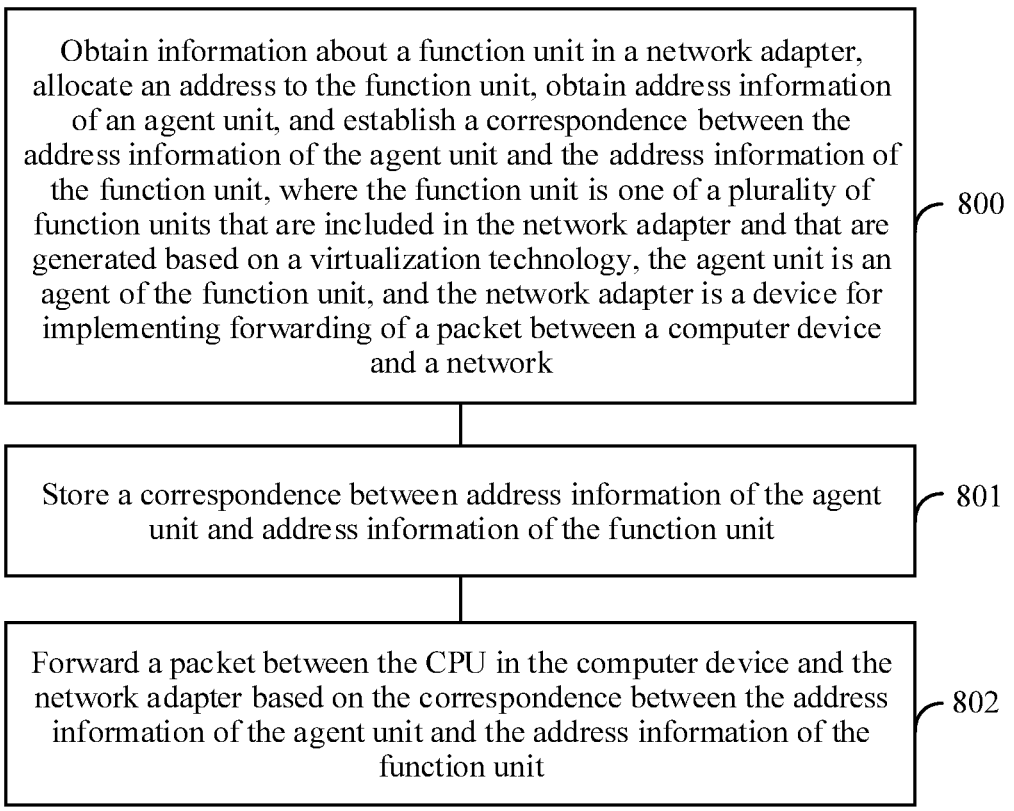
FIG. 8B is a schematic flowchart of another packet forwarding method according to an embodiment.

In another implementation, as shown in FIG. 8B, the method further includes the following.

Step 801. Store a correspondence between address information of the agent unit and address information of the function unit.

Further, the foregoing method may be implemented by the intermediate device 204 in FIG. 2A to FIG. 2D or the intermediate device 304 in FIG. 3. That is, the method flow shown in FIG. 8A or FIG. 8B may be implemented with reference to the intermediate device 204 in FIG. 2A to FIG. 2D or the intermediate device 304 in FIG. 3. In addition, the function unit described in the implementation shown in FIG. 8A or FIG. 8B may be implemented with reference to the implementation of the PF and/or VF mentioned in FIG. 2A to FIG. 2D or FIG. 3, and the agent unit may be implemented with reference to the implementation of the PF' and/or VF' mentioned in FIG. 2A to FIG. 2D or FIG. 3. Details are not described again.

Figure 9A:
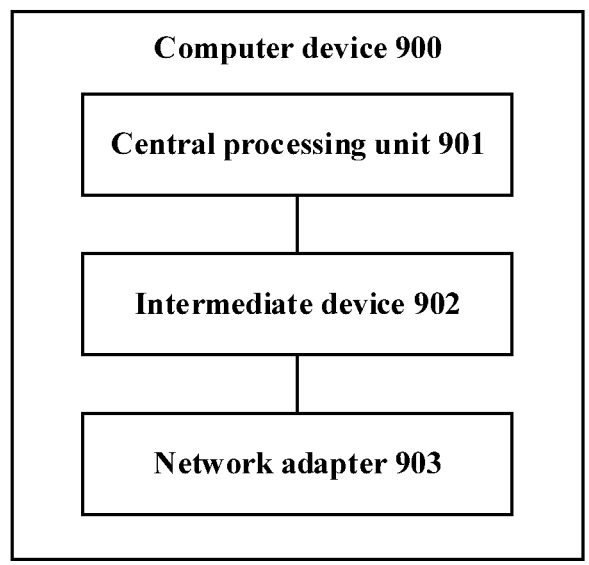
FIG. 9A is a schematic structural diagram of a computer device 900 according to an embodiment.

FIG. 9A is a schematic structural diagram of a computer device 900 according to an embodiment. As shown in FIG. 9A, the computer device 900 includes a CPU 901, a network adapter 903, and an intermediate device 902, where the intermediate device 902 is coupled to both the CPU 901 and the network adapter 903 through the bus, and the network adapter 903 includes a plurality of function units generated based on a virtualization technology. For example, the network adapter 903 includes a plurality of PFs or VFs generated based on an SR-IOV virtualization technology.

The intermediate device 902 is configured to discover, through enumeration, the network adapter 903 coupled to the intermediate device 902, and allocate address information to a first function unit in the network adapter 903.

The CPU 901 is configured to discover, through enumeration, the intermediate device 902 coupled to the CPU 901, and allocate address information to a first agent unit in the intermediate device 902, where the first agent unit is an agent of the first function unit.

The intermediate device 902 is further configured to establish a correspondence between the address information of the first agent unit and the address information of the first function unit, and implement forwarding of a packet (such as a data packet or a command packet) between the CPU 901 and the network adapter 903 based on the correspondence between the address information of the first agent unit and the address information of the first function unit.

The computer device 900 includes the intermediate device 902, and the intermediate device 902 can implement forwarding of the data packet or the command packet between the CPU 901 and the network adapter 903. The intermediate device 902 establishes the correspondence between the address information of the first agent unit and the address information of the first function unit, and can implement forwarding of the data packet or the command packet between the CPU 901 and the network adapter 903 based on the correspondence between the address information of the first agent unit and the address information of the first function unit. In this way, the CPU 901 can implement forwarding of the data packet or the command packet between the CPU 901 and the network adapter 903 without using another CPU, such that operations such as a software conversion that are needed when the data packet or the command packet is forwarded to another CPU are omitted, thereby reducing a delay in sending the data packet or the command packet. In addition, because the data packet or the command packet is no longer forwarded through the communications bus between the CPUs, there is no problem that a delay is excessively high because of insufficient bandwidth of the communications bus.

Figure 9B:
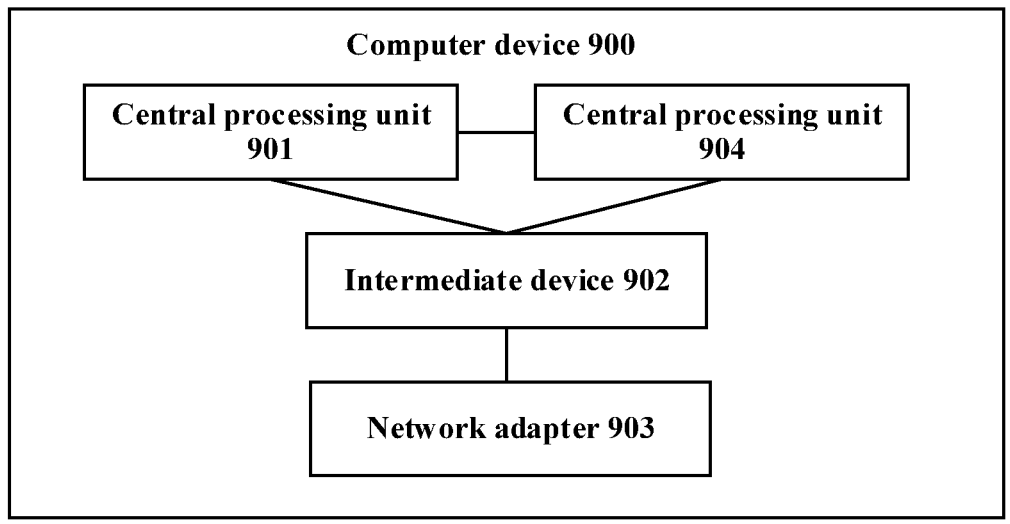
FIG. 9B is another schematic structural diagram of the computer device 900 according to an embodiment.

Optionally, as shown in FIG. 9B, the computer device 900 further includes a CPU 904.

The CPU 904 is coupled to both the CPU 901 and the intermediate device 902 through the bus.

The intermediate device 902 is further configured to allocate address information to a second function unit in the network adapter 903.

The CPU 904 is configured to discover, through enumeration, the intermediate device 902 coupled to the CPU 904, and allocate address information to a second agent unit the intermediate device 902, where the second agent unit is an agent of the second function unit.

The intermediate device 902 establishes a correspondence between the address information of the second agent unit and the address information of the second function unit, and implements forwarding of a packet (a data packet or a command packet) between the CPU 904 and the network adapter 903 based on the correspondence between the address information of the second agent unit and the address information of the second function unit.

Figure 9C:
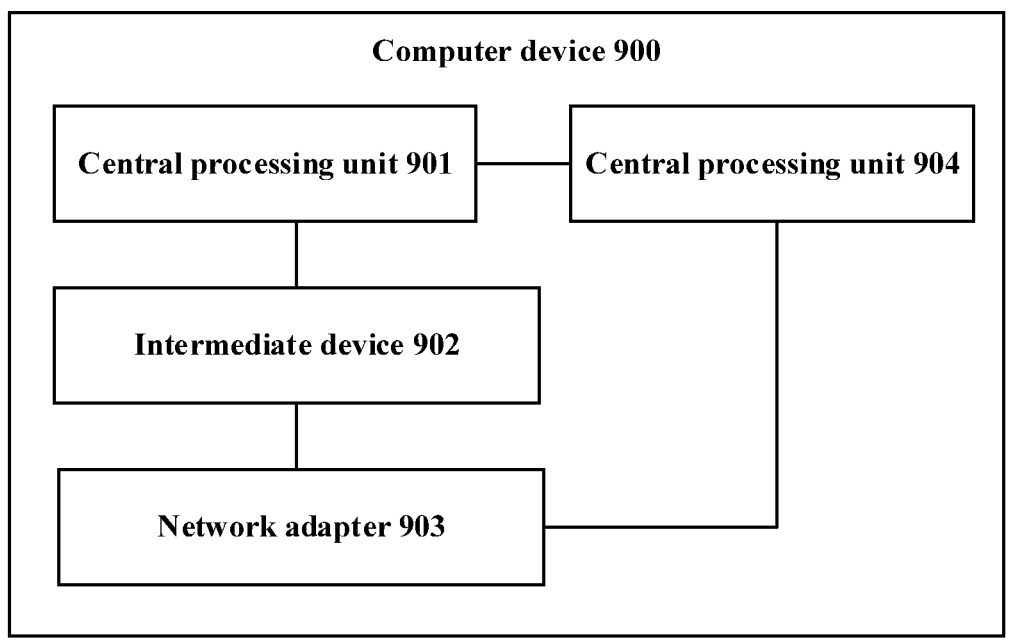
FIG. 9C is still another schematic structural diagram of the computer device 900 according to an embodiment.

Optionally, as shown in FIG. 9C, the computer device 900 further includes a CPU 904.

The CPU 904 is coupled to both the CPU 901 and the network adapter 903 through the bus.

The network adapter 903 is further configured to implement forwarding of a packet (such as a data packet or a command packet) between the CPU 904 and a network.

Figure 9D:
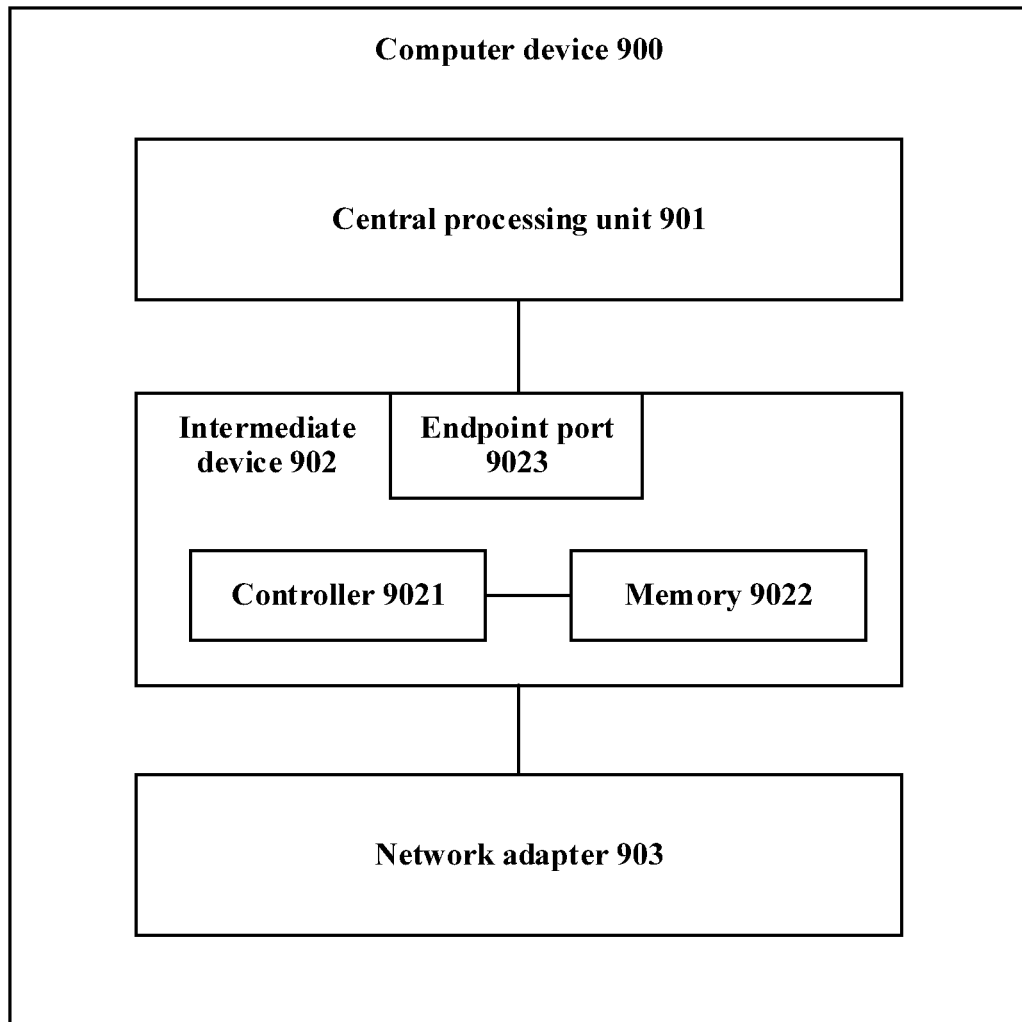
FIG. 9D is still another schematic structural diagram of the computer device 900 according to an embodiment.

In this embodiment, as shown in FIG. 9D, the intermediate device 902 may further include a controller 9021 and a memory 9022. The controller 9021 is configured to establish a correspondence between the address information of the first agent unit and the address information of the first function unit.

The memory 9022 is configured to store the correspondence between the address information of the first agent unit and the address information of the first function unit.

The controller 9021 is further configured to implement forwarding of a packet (such as a data packet or a command packet) between the CPU 901 and the network adapter 903 based on the correspondence between the address information of the first agent unit and the address information of the first function unit.

Illustratively, the controller 9021 may configure the first agent unit by configuring information about the first agent unit in the endpoint port 9023. The endpoint port 9023 is a port used to couple the intermediate device 902 to the CPU 901.

In example implementation, for implementation of the computer device 900 shown in FIG. 9A to FIG. 9D, reference may be made to the implementation of the server 200 in FIG. 2A to FIG. 2D and the server 300 in FIG. 3. For example, the intermediate device 902 may be implemented with reference to the implementation of the intermediate device 204 in FIG. 2A to FIG. 2D, or may be implemented with reference to the implementation of the intermediate device 304 in FIG. 3, the controller 9021 may be implemented with reference to the implementation of the controller 2041 in FIG. 2A to FIG. 2D, or may be implemented with reference to the implementation of the controller 3041 in FIG. 3, the CPU 901 may be implemented with reference to the implementation of CPU 202 in FIG. 2A to FIG. 2D, or may be implemented with reference to the implementation of CPU 302 in FIG. 3, the CPU 904 may be implemented with reference to the implementation of CPU 201 in FIG. 2A to FIG. 2D, or may be implemented with reference to the implementation of CPU 301 in FIG. 3, and the network adapter 903 may be implemented with reference to the implementation of the network adapter 203 in FIG. 2A to FIG. 2D, or may be implemented with reference to the implementation of the network adapter 303 in FIG. 3. In addition, the first function unit or the second function unit in the embodiments described in FIG. 9A and FIG. 9B may be implemented with reference to the implementation of PF and/or VF mentioned in FIG. 2A to FIG. 2D or FIG. 3, and the first agent unit or the second agent unit may be implemented with reference to the implementation of PF' and/or VF' mentioned in FIG. 2A to FIG. 2D or FIG. 3. Details are not described again.

It can be understood that when the intermediate device 902 is implemented by an FPGA chip, the FPGA chip may include a controller 9021 and a memory 9022. When the intermediate device 902 is implemented by an ASIC chip, a function of the controller may be implemented by the ASIC chip, and a function of the memory 9022 may be implemented by a memory (such as a RAM) coupled to the ASIC chip. Illustratively, when the intermediate device 902 is implemented by an ASIC, the function of the controller 9021 may be implemented by the ASIC, and the function of the memory 9022 may be implemented by a memory coupled to the ASIC, when the intermediate device 902 is implemented by an FPGA+ an ASIC, the function of the controller 9021 may be implemented by the ASIC, and the function of the memory 9022 may be implemented by the FPGA, or when the intermediate device 902 is implemented by an FPGA+ an ASIC, the function of the controller 9021 may be implemented by both the FPGA and the ASIC, and the function of the memory 9022 may be implemented by the FPGA. Details are not described.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In the several embodiments, it should be understood that the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a Universal Serial Bus (USB) flash drive, a removable hard disk, a read-only memory (ROM), a RAM, a magnetic disk, or an optical disc.

The foregoing descriptions are merely example embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A computer device comprising:
   a network adapter comprising a plurality of functional systems based on a virtualization technology, wherein the functional systems comprise a first functional system;
   a bus;
   a first central processing unit (CPU) coupled to the bus and configured to:
      obtain first agent information about a first agent corresponding to the first functional system;
      allocate a second address to the first agent; and
      send first address information of the second address, wherein the first address information comprises first bus device function (BDF) information of the first agent and first base address register (BAR) space address information of the first agent; and
   an intermediate device coupled to both the first CPU and the network adapter through the bus, comprising the first agent, and configured to:
      obtain first functional system information about the first functional system;
      allocate a first address to the first functional system;
      receive the first address information from the first CPU;
      establish a first correspondence between the first address information and second address information of the first functional system based on the first address information, wherein the second address information comprises second BDF information of the first functional system and second BAR space address information of the first functional system; and
      forward a first packet between the first CPU and the network adapter based on the first correspondence.

2. The computer device of claim 1, further comprising a second CPU coupled to both the first CPU and the intermediate device through the bus, wherein the intermediate device is further configured to:

obtain second functional system information about a second functional system in the network adapter; and allocate a third address to the second functional system, wherein the second functional system is configured to implement a function of the network adapter;

wherein the second CPU is configured to:
obtain second agent information about a second agent in the intermediate device;
allocate a fourth address to the second agent; and
send third address information of the fourth address to the intermediate device, wherein the second agent corresponds to the second functional system, wherein the intermediate device is further configured to:
establish a second correspondence between the third address information and fourth address information of the third address based on the third address information; and
forward a second packet between the second CPU and the network adapter based on the second correspondence.

3. The computer device of claim 1, further comprising a second CPU coupled to both the first CPU and the network adapter through the bus, wherein the network adapter is further configured to forward a second packet between the second CPU and a network.

4. The computer device of claim 1, wherein the first CPU is further configured to obtain second agent information about a second agent in the intermediate device by enumerating the intermediate device.

5. The computer device of claim 1, wherein the intermediate device is further configured to further obtain the first functional system information by enumerating the network adapter.

6. The computer device of claim 1, wherein the intermediate device comprises a first endpoint coupled to the first CPU, and wherein the intermediate device is further configured to configure information about the first agent in an endpoint port based on the information about the first functional system.

7. The computer device of claim 1, wherein the network adapter is configured to support a single-root input/output virtualization (SR-IOV) function, and wherein the first functional system comprises a physical function or a virtual function.

8. An intermediate device configured to couple to a first central processing unit (CPU) of a computer device and a network adapter of the computer device through a bus, wherein the intermediate device comprises:
a controller configured to:
obtain first functional system information about a first functional system, wherein the first functional system is based on a virtualization technology in the network adapter;
allocate a first address to the first functional system;
establish a first correspondence between first address information of a first agent and second address information of the first address based on the first address information, wherein the first agent corresponds to the first functional system, wherein the second address information comprises second bus device function (BDF) information of the first functional system and second base address resister (BAR) space address information of the first functional system, and wherein the first address information comprises first BDF information of the first agent and first BAR space address information of the first agent; and
forward a first packet between the first CPU and the network adapter based on the first correspondence, and
a memory coupled to the controller and configured to store the first correspondence.

9. The intermediate device of claim 8, wherein the intermediate device is further configured to couple to a second CPU of the computer device, and wherein the controller is further configured to:
obtain second functional system information about a second functional system of the network adapter;
allocate a second address to the second functional system;
obtain third address information of a second agent, wherein the second agent corresponds to the second functional system;
establish a second correspondence between the third address information and fourth address information of the second address;
store the second correspondence; and
forward a second packet between the second CPU and the network adapter based on the second correspondence.

10. The intermediate device of claim 8, wherein the controller is further configured to:
further obtain the first functional system information by enumerating the network adapter;
allocate third address information to the first functional system; and
store the third address information in the memory.

11. The intermediate device of claim 10, further comprising an endpoint port coupled to the controller, wherein the intermediate device is further configured to couple to the first CPU using the endpoint port, and wherein the controller is further configured to configure first agent information about the first agent in the endpoint port based on the information about the first functional system.

12. The intermediate device of claim 11, wherein the controller is further configured to establish the first correspondence based on the first address information from the first CPU.

13. The intermediate device of claim 10, further comprising an endpoint port coupled to the controller, wherein the intermediate device is further configured to couple to the first CPU using the endpoint port, wherein the endpoint port comprises pre-determined information about the first agent, and wherein the controller is further configured to establish a second correspondence between the first address information and the third address information based on the first address information from the first CPU.

14. A packet forwarding method implemented by an intermediate device of a computer device and comprising:
coupling to a first central processing unit (CPU) of the computer device and a network adapter of the computer device through a bus;
obtaining first functional system information about a first functional system, wherein the first functional system is based on a virtualization technology, in the network adapter;
allocating a first address to the first functional system;
establishing a first correspondence between first address information of a first agent and second address information of the first address, wherein the first agent corresponds to the first functional system, wherein the second address information comprises second bus device function (BDF) information of the first functional system and second base address register (BAR) space address information of the first functional system, and wherein the first address information comprises first BDF information of the first agent and first BAR space address information of the first agent;

forwarding a first packet between the first CPU and the network adapter based on the first correspondence; and storing the first correspondence.

15. The packet forwarding method of claim 14, further comprising:

coupling to a second CPU of the computer device;

obtaining second functional system information about a second functional system of the network adapter;

allocating a second address to the second functional system;

obtaining third address information of a second agent, wherein the second agent corresponds to the second functional system;

establishing a second correspondence between the third address information and fourth address information of the second address;

storing the second correspondence; and forwarding a second packet between the second CPU and the network adapter based on the second correspondence.

16. The packet forwarding method of claim 14, further comprising:

further obtaining the first functional system information about by enumerating the network adapter;

allocating third address information to the first functional system; and storing the third address information in a memory.

17. The packet forwarding method of claim 16, further comprising:

further coupling to the first CPU using an endpoint port; and configuring first agent information about the first agent in the endpoint port based on the first functional system information.

18. The packet forwarding method of claim 17, further comprising establishing the first correspondence based on the first address information from the first CPU.

19. The packet forwarding method of claim 16, further comprising:

further coupling to the first CPU using an endpoint port, wherein the endpoint port comprises pre-determined information about the first agent; and establishing a second correspondence between the first address information and the third address information based on the first address information from the first CPU.

* * * * *